(12) United States Patent
Van Der Ende

(10) Patent No.: US 10,927,665 B2
(45) Date of Patent: Feb. 23, 2021

(54) COMPOSITE SLICKLINE COMMUNICATION

(71) Applicant: Paradigm Technology Services B.V., Groot Ammers (NL)

(72) Inventor: Andre Van Der Ende, Udny Green (GB)

(73) Assignee: PARADIGM TECHNOLOGY SERVICES B.V., Groot-Ammers (NL)

(*) Notice: Subject to any disclaimer, the term of this patent is extended or adjusted under 35 U.S.C. 154(b) by 0 days.

(21) Appl. No.: 15/544,768

(22) PCT Filed: Jan. 19, 2016

(86) PCT No.: PCT/EP2016/051030
§ 371 (c)(1),
(2) Date: Jul. 19, 2017

(87) PCT Pub. No.: WO2016/116454
PCT Pub. Date: Jul. 28, 2016

(65) Prior Publication Data
US 2017/0328198 A1 Nov. 16, 2017

(30) Foreign Application Priority Data
Jan. 19, 2015 (GB) .................................. 1500884

(51) Int. Cl.
*H01B 7/17* (2006.01)
*E21B 47/13* (2012.01)
(Continued)

(52) U.S. Cl.
CPC .............. *E21B 47/13* (2020.05); *D07B 1/147* (2013.01); *E21B 17/003* (2013.01);
(Continued)

(58) Field of Classification Search
CPC .......... D07B 1/147; D07B 1/04; D07B 1/068; D07B 1/145; D07B 1/16; D07B 1/165;
(Continued)

(56) References Cited

U.S. PATENT DOCUMENTS 6,761,574 B1 * 7/2004 Song ..................... E21B 4/18
285/39
2007/0044991 A1 3/2007 Varkey
(Continued)

FOREIGN PATENT DOCUMENTS

WO 0120129 A2 3/2001
WO 2004063528 A1 7/2004
(Continued)

*Primary Examiner* — Benyam Haile
(74) *Attorney, Agent, or Firm* — William H. Honaker; Dickinson Wright PLLC

(57) ABSTRACT

A communication system, comprises a composite slickline including an electrical conductor surrounded by an electrically insulating structural material, a downhole tool; and a sensing element. The composite slickline is mechanically and electrically coupled to the downhole tool and extends from the downhole tool to the sensing element. The composite slickline and the sensing element are capacitively coupled so as to permit relative movement therebetween and so as to permit an electric field to extend from the electrical conductor of the composite slickline to the sensing element through the electrically insulating structural material of the composite slickline for the transmission of an electrical and/or an electromagnetic signal between the downhole tool and the sensing element via the composite slickline.

26 Claims, 10 Drawing Sheets

(51) Int. Cl.
- *H01B 7/18* (2006.01)
- *H01B 7/04* (2006.01)
- *D07B 1/14* (2006.01)
- *E21B 17/00* (2006.01)
- *G01V 11/00* (2006.01)

(52) U.S. Cl.
CPC ............ *G01V 11/002* (2013.01); *H01B 7/046* (2013.01); *H01B 7/1875* (2013.01); *H01B 7/17* (2013.01)

(58) Field of Classification Search
CPC .... D07B 2201/2011; D07B 2201/2044; D07B 2201/2046; D07B 2201/2087; H01B 7/046; H01B 7/045; H01B 7/1825; H01B 7/2806; E21B 17/206; E21B 17/12; E21B 17/122; G01V 11/002
See application file for complete search history.

(56) References Cited

U.S. PATENT DOCUMENTS

| | | | |
|---|---|---|---|
| 2013/0183177 A1* | 7/2013 | Manke | E21B 17/206 417/422 |
| 2015/0009041 A1* | 1/2015 | van der Ende | E21B 47/122 340/854.9 |
| 2016/0217888 A1* | 7/2016 | Xiang | E21B 17/003 |

FOREIGN PATENT DOCUMENTS

| | | | |
|---|---|---|---|
| WO | 2006054092 A1 | 5/2006 | |
| WO | 2011051677 A2 | 5/2011 | |
| WO | 2013098280 A2 | 7/2013 | |
| WO | WO-2013098280 A2 * | 7/2013 | ............ E21B 47/12 |
| WO | WO 2013098280 A3 * | 9/2013 | ........... E21B 47/122 |

* cited by examiner

COMPOSITE SLICKLINE COMMUNICATION

CROSS-REFERENCE TO RELATED APPLICATION

The present invention claims priority to PCT International Patent Application Serial No. PCT/EP2016/051030 filed Jan. 19, 2016 entitled "Composite Slickline Communication," which claims the benefit of GB Patent Application Serial No. 1500884.0 filed Jan. 19, 2015, the entire disclosures of the applications being considered part of the disclosure of this application and hereby incorporated by reference.

FIELD

A composite slickline communication system and a composite slickline communication method is described herein for use in particular, but not exclusively, for downhole communications to and/or from a tool for use in a wellbore such as the wellbore of an oil or gas well.

BACKGROUND

During light duty well service operations or logging operations, tools can be lowered into the well on various types of flexible line. Lowering tools on a flexible line is faster and less costly than lowering tools on a drill string or a tubing string of rigid jointed tubes.

Known flexible line may be divided into two general types: slickline and electric line. Conventional slickline is a single strand of steel wire, and is used to lower mechanical tools and data logging tools (commonly known in the industry as memory tools). Electric line has a flexible multi-stranded load-bearing outer armour surrounding one or more insulated electrical conductors. Electric line is used for conveying electric line logging tools that receive electric power from the surface, and return data to the surface, over the electrical conductors.

When compared to the use of a stranded electric line, the use of slickline may offer the advantages of lower cost and faster running speeds, and may permit a pressure seal to be formed more readily around the slickline at the wellhead in a device called a stuffing box. This may enable safer wireline operations in a live well compared with a stranded electric line because it is generally more difficult to form an effective seal around a stranded electric line. On the other hand, the great benefit of electric line is that it is possible to return real time data to surface over the electrical conductors. This enables the well service operation or logging operation to be more effectively and efficiently managed.

Electric line and slickline are deployed into the well from a motorised drum that stores the cable and also acts as a winch, lowering or raising the tools in the well by rotating the drum and hence spooling more or less cable from the drum. In the case of electric line, as the surface instrumentation is typically not located in the drum, special rotatable electrical contacts known as "slip-rings" are required between the rotating drum and the surface electrical equipment that is not rotating. Slip-rings may, however, not always operate reliably.

An apparatus and method is disclosed in EP 1,214,501 whereby the advantages of both electric line and slickline are achieved in a type of wireline cable, known as a coated slickline or an insulated slickline. The coated slickline is a conventional steel slickline coated with a thin, hard, durable, non-conductive and flexible coating. This maintains the highly desirable lower cost, higher running speeds and pressure sealing ability of the conventional slickline, while providing the potential for data transmission to surface. The coated slickline conducts electrical or electromagnetic signals from a downhole transmitter to surface. As the coated slickline emerges from the wellhead, the coated slickline acts as an antenna and radiates signals to an adjacent receiver. There is no need to make any sort of electrical contact with the slickline at the surface and, hence, there is no need for modification of the slickline unit to contain slip rings in the cable drum. Whilst the method disclosed in EP 1,214,501 has the advantage of avoiding the need for slip rings, the method may not be reliable over a wide range of well depths and/or through a wide range of well fluids.

WO 2004/063528 discloses a system which includes a surface control unit which is electrically connected both to a coated slickline and to a wellhead. Although not explicitly disclosed, this system requires the use of slip rings to enable an electrical connection to be made from a static surface control unit to the end of the coated slickline which is contained within the rotating cable drum.

WO 2011/051677 discloses a composite slickline which may include an electrical conductor surrounded by a structural composite layer comprising a plurality of non-metallic fibres embedded in a matrix material. The electrical conductor may provide for the transfer of an electric signal, an electromagnetic signal and/or electrical power along the composite slickline.

WO 2013/098280 discloses a wellbore communication system including a downhole tool and an insulated slickline for use in communicating between the downhole tool and a surface receiver.

SUMMARY

It should be understood that any one or more of the features of the systems, methods or composite slicklines described below may apply alone or in any combination in relation to any of the other systems, methods or composite slicklines described below.

A communication system comprises:
a downhole tool;
a sensing element; and
a composite slickline,
wherein the composite slickline is mechanically and electrically coupled to the downhole tool and extends from the downhole tool to the sensing element, and
wherein the slickline and the sensing element are capacitively coupled so as to permit transmission of information between the downhole tool and the sensing element via the composite slickline.

In use, the downhole tool may be deployed or located downhole, for example in the wellbore of an oil or gas well.

The downhole tool may comprise a tool transmitter. The tool transmitter may be electrically coupled to the composite slickline.

The system may comprise a surface receiver. The surface receiver may be located at or adjacent a surface of the ground, a surface of the seabed or a surface of the sea. The surface receiver may be located above the ground, above the seabed or above the sea surface. The surface receiver may be electrically coupled to the sensing element. Such a system may permit the transmission of information from the tool transmitter to the surface receiver via the composite slickline and the sensing element.

The composite slickline may comprise an electrical conductor.

The electrical conductor may be configured for the transfer of electrical and/or electromagnetic signals along the composite slickline. The electrical conductor may be configured for the transfer of electrical power along the composite slickline.

The composite slickline may be configured to have a resistance of between 10 and 100 ohm/km, a resistance of between 30 and 50 ohm/km or a resistance of approximately 40 ohm/km. For example, the electrical conductor may be configured to provide the composite slickline with a resistance of between 10 and 100 ohm/km, a resistance of between 30 and 50 ohm/km, or a resistance of approximately 40 ohm/km.

The electrical conductor may comprise a metal.

The electrical conductor may comprise copper, steel, aluminium or the like.

The electrical conductor may have a diameter of between 0.1 and 1.0 mm, a diameter of between 0.2 and 0.4 mm, or a diameter of approximately 0.3 mm. The electrical conductor may have a diameter of 0.32 mm.

The electrical conductor may comprise a plurality of electrically conductive strands, wherein each strand is in electrical contact with each of the other strands.

The electrically conductive strands may, for example, be twisted together to form a twisted electrical conductor.

The electrical conductor may comprise a central strand and one or more outer strands twisted around the central strand. For example, the electrical conductor may comprise a central strand and six outer strands twisted around the central strand.

Each strand may comprise a metal. For example, each strand may comprise copper, steel, aluminium or the like.

Each strand may have a diameter of between 0.1 and 1.0 mm, a diameter of between 0.2 and 0.4 mm, or a diameter of approximately 0.3 mm. Each strand may have a diameter of 0.32 mm.

The composite slickline may comprise a plurality of electrical conductors. Each electrical conductor may be electrically insulated from each of the other electrical conductors. For example, each electrical conductor may be coated or may be embedded within an electrically insulating matrix material.

The composite slickline may comprise an electrically insulating structural material.

The electrically insulating structural material may surround the electrical conductor.

The electrically insulating structural material may be configured to provide the composite slickline with mechanical strength whilst insulating the electrical conductor from an environment external to the composite slickline.

The electrically insulating structural material may be provided in one or more layers.

The electrically insulating structural material may comprise an electrically insulating composite material.

The electrically insulating composite material may be configured to provide the composite slickline with mechanical strength whilst insulating the electrical conductor from an environment external to the composite slickline.

The composite material may comprise a plurality of reinforcing elements embedded in a matrix material.

Such a composite slickline may have a lower weight and/or a higher strength than a conventional insulating slickline. This may enable the use of longer lengths of composite slickline compared with conventional slickline. Such a composite slickline may, for example, be used to mechanically propel a reciprocating tool tractor down into a horizontal well over further distances and/or provide for safer pull-back of the reciprocating tool tractor.

The composite slickline may provide improved electrical insulation of the electrical conductor compared with a conventional insulated or coated slickline. This may enable use of the composite slickline in open-hole situations in the absence of an electrically conductive tubular such as an electrically conductive casing through which a downhole tool may run and through which the composite slickline may extend. The improved electrical insulation provided by the composite slickline reduces the effect of the wellbore environment on the signal transmission properties of the composite slickline. The electrical insulation provided by the composite slickline may be sufficient to permit a signal return path to be formed, or to be at least partially defined by, at least one of a formation around the wellbore, drilling mud and wellbore fluids such as water, for example, seawater in the wellbore.

The matrix material may be compliant or elastomeric, facilitating distribution of load between the reinforcing elements.

The matrix material may comprise a thermoplastic material, such as a polyether ether ketone (PEEK) material. The use of thermoplastic material, having a degree of resilience, tends to improve the bend radius of the member, facilitating use of the member with apparatus and methods originally intended for use with relatively flexible metallic members such as conventional slickline and wireline. The matrix material may comprise an elastomer, for example a perfluoroelastomeric material such as sold under the Kalrez trademark. In other embodiments the matrix may be a thermosetting material, liquid crystal polymer (LCP) material or Polyamide 46 (Stanyl).

The reinforcing elements may be electrically non-conductive.

The reinforcing elements may be non-metallic.

The reinforcing elements may comprise fibres.

The reinforcing elements may comprise monofilaments.

The reinforcing elements may comprise at least one of a para-aramid material, a meta-aramid material, a glass, polybenzobisoxazole (PBO), liquid crystal polymer (LCP) and carbon.

The reinforcing elements may comprise a material sold under at least one of the trademarks Kevlar, Zylon, 12k Thornel, Twaron and E-glass.

The reinforcing elements may be configured, for example, oriented so as to provide strength in one or more preferred directions.

At least some of the reinforcing elements may be continuous. At least some of the reinforcing elements may extend along the entire length of the composite slickline. At least some of the reinforcing elements may extend along a significant proportion of the length of the composite slickline.

At least some of the reinforcing elements may extend solely longitudinally, that is parallel to an axis of the composite slickline with little or no twisting or weaving. Thus, when in tension, each reinforcing element will tend not to cut across other reinforcing elements.

At least some of the reinforcing elements may be oriented at an angle to the axis of the composite slickline.

At least some of the reinforcing elements may be oriented at a first angle to the axis of the composite slickline and at least some of the reinforcing elements may be oriented at a second angle to the axis of the composite slickline.

The first and second angles may have the same sign or a different sign.

The first and second angles may have the same magnitude or a different magnitude.

At least some of the reinforcing elements may be oriented in a substantially circumferential direction.

The composite slickline may comprise an enamel coating. For example, the composite slickline may comprise a coating comprising polyester, polyamide, polyamide-imide, polycarbonates, polysulfones, polyester imides, a polyether ether ketone (PEEK) material, polyurethane, nylon, epoxy, equilibrating resin, alkyd resin, THEIC polyester, or the like or any combination thereof.

The composite slickline may include a sleeve or coating around the electrically insulating structural material. The coating may provide abrasion resistance for the composite slickline, protecting the electrically insulating structural material from damage. The coating may be visually distinguishable from the electrically insulating structural material, for example the coating may be a different colour from the electrically insulating structural material, to facilitate identification of wear of the coating. The coating may be compatible with the matrix material, and may be the same or a similar material to the matrix material. The coating may comprise materials selected to enhance tribological or electrostatic dissipative properties, for example the coating may comprise one or more of graphite, short para/meta-aramid fiber, carbon nanofibers (CNFs), titanium carbide (TiC) and a ceramic material.

The composite slickline may have an outer diameter of between 3 mm and 7 mm, an outer diameter of between 4 mm and 6 mm, or an outer diameter of approximately 5 mm.

The composite slickline may have a weight of between 21 kg/km and 41 kg/km, a weight of between 26 kg/km and 36 kg/km, or a weight of approximately 31 kg/km.

The composite slickline may have a minimum breaking load (MBL) of 1700 to 3700 kg, a MBL of 2500 to 2900 kg, or an approximate MBL of 2700 kg.

The composite slickline may comprise one or more optical fibres.

The composite slickline may comprise one or more hydraulic control lines.

The composite slickline and the sensing element may be capacitively coupled so as to permit relative movement therebetween.

The composite slickline and the sensing element may be capacitively coupled so as to permit an electric field to extend from the core of the composite slickline to the sensing element through the structural composite layer of the composite slickline.

Surprisingly, the Applicant has discovered that capacitive coupling is possible between the composite slickline and the sensing element despite the improved electrical insulation provided by the electrically insulating structural material.

Such a system may provide an enhancement in coupling efficiency between the composite slickline and the sensing element compared with known systems which rely on radiation of an electromagnetic signal between a coated slickline and a surface antenna across a gap which is greater than the extent of an electric field extending from the coated slickline. Such an enhancement in coupling efficiency may provide an enhancement in communication bandwidth and/or permit communication along longer lengths of composite slickline.

The system may be configured so that an electromagnetic signal in the composite slickline generates an electromagnetic signal in the sensing element or vice versa.

The system may be configured so that an electrical signal in the composite slickline generates an electrical signal in the sensing element or vice versa.

The system may be configured so that a voltage signal in the composite slickline generates a voltage signal in the sensing element or vice versa.

The system may be configured so as to provide a predetermined relationship between an electrical signal in the composite slickline and an electrical signal in the sensing element. For example, the electrical signal in the sensing element may be associated with, related to, representative of, and/or proportional to the electrical signal in the composite slickline or vice versa.

The tool transmitter may comprise electronic circuitry.

The tool transmitter may employ frequency shift key (FSK) signalling using a sinusoidal or square wave carrier frequency in the range 2 kHz to 25 kHz.

The tool transmitter may employ an encoding scheme such as Manchester Data encoding as a modulation scheme.

The sensing element may be directly or indirectly coupled to the surface receiver.

The surface receiver may comprise electronic circuitry.

The surface receiver may be configured to receive an electrical signal, for example a voltage signal, from the sensing element.

The surface receiver may be configured to detect an electrical signal, for example a voltage signal, received from the sensing element.

The surface receiver may be configured to amplify an electrical signal, for example, a voltage signal received from the sensing element.

The surface receiver may have a high input impedance.

The surface receiver may be configured for communication with a user interface such as a graphical user interface, data input means, a control panel and/or the like. The surface receiver may be configured for wireless or wireline communication with a user interface. The surface receiver may be configured for communication with a user interface which is located adjacent to the surface receiver at a wellhead or which is located remotely from the surface receiver.

The surface receiver may be configured for communication with a data store. The data store may be located proximate to the surface receiver at a wellhead or may be located remotely from the surface receiver.

The sensing element may be separated from the composite slickline by a gap. This may avoid the need for any physical contact between the sensing element and the composite slickline. This may reduce or eliminate wear and/or damage caused by friction effects between the composite slickline and the sensing element which may otherwise occur during relative movement therebetween. In addition, such a system may not be subject to the same degree of signal degradation due to build-up of dirt, particulates foreign matter, hydrates or the like that may occur with known slickline coupling arrangements which require physical contact between a sensing element and an electrical conductor of a slickline. The gap may be selected so as to permit capacitive coupling of an electrical signal between the electrical conductor of the composite slickline and the sensing element.

The sensing element may engage the composite slickline. Such an arrangement may ensure that the sensing element is in close proximity to the core of the composite slickline for enhanced capacitive coupling of the electric field between the composite slickline and the sensing element.

The sensing element may be elongated.

The sensing element may extend in a direction along which the composite slickline extends. Such an arrangement may increase a spatial extent of coupling of the electric field between the composite slickline and the sensing element and, therefore, enhance the degree of coupling of the electric field between the composite slickline and the sensing element.

The sensing element may partially surround the composite slickline.

The sensing element may have a discontinuous cross-section in a plane lateral to the composite slickline.

The sensing element may be split longitudinally along a direction of the composite slickline.

The sensing element may define a generally concave surface profile.

The sensing element may define a surface profile which is substantially complementary to an outer surface of the composite slickline. Such a surface profile may increase a spatial extent of coupling of the electric field between the composite slickline and the sensing element and, therefore, enhance the degree of coupling of the electric field between the composite slickline and the sensing element.

The sensing element may define a U-shaped surface profile. Such a profile may permit the sensing element to be moved into a position adjacent the composite slickline or into engagement with the composite slickline. Such a surface profile may increase a spatial extent of coupling of the electric field between the composite slickline and the sensing element and, therefore, enhance the degree of coupling of the electric field between the composite slickline and the sensing element.

The sensing element may define a channel along which the composite slickline extends.

The composite slickline may extend through the sensing element. Such an arrangement may increase a spatial extent of coupling of the electric field between the composite slickline and the sensing element and, therefore, enhance the degree of coupling of the electric field between the composite slickline and the sensing element.

The sensing element may define an aperture through which the composite slickline extends.

The sensing element may define a channel through which the composite slickline extends.

The sensing element may be tubular.

The sensing element may define an elongated channel. Such an arrangement may increase a spatial extent of coupling of the electric field between the composite slickline and the sensing element and, therefore, enhance the degree of coupling of the electric field between the composite slickline and the sensing element.

The sensing element may comprise an elongated tube.

The sensing element may define a channel of a length which is greater than a diameter of the composite slickline.

The sensing element may define a channel of a length which is at least twice the diameter of the composite slickline, at least five times greater than the diameter of the composite slickline, at least ten times greater than the diameter of the composite slickline or at least one hundred times greater than the diameter of the composite slickline.

The sensing element may comprise an electric field sensor.

The composite slickline and the sensing element may be inductively coupled.

The sensing element may comprise at least one of a loop, a ring, a coil and the like or a portion thereof.

The sensing element may comprise a ferritic material.

The sensing element may comprise a magnetic field sensor such as a Hall-effect sensor or the like.

The system may comprise a wellhead member or a stuffing box, wherein the sensing element is attached to the outside of the wellhead member or the stuffing box.

The system may comprise a housing mounted on the stuffing box. The sensing element may be housed within the housing.

The system may comprise a toroid positioned around the composite slickline.

The use of a toroid positioned around the composite slickline may serve to reduce electrical noise received at the surface receiver.

The system may comprise one or more ferrite rings positioned around the slickline. The use of one or more ferrite rings positioned around the slickline may serve to reduce electrical noise received at the surface receiver.

The system may comprise first and second toroids positioned adjacent to one another around the composite slickline.

The first toroid may be used to sense electrical noise carried by the conductive core of the composite slickline.

The first toroid may be used to sense 50 Hz electrical noise carried by the conductive core of the composite slickline.

The second toroid may be used to apply an electrical signal to the conductive core of the composite slickline for cancellation of the electrical noise.

The first toroid may be used to sense 50 Hz electrical noise carried by the conductive core of the composite slickline.

The second toroid may be used to apply a 50 Hz electrical signal to the conductive core of the composite slickline for cancellation of the 50 Hz electrical noise. The toroid and/or the ferrite ring may be positioned between the sensing element and an upper end of the composite slickline.

The sensing element may be located within flow tubes of the stuffing box.

The system may be configured to urge the composite slickline towards the sensing element.

The system may be configured to urge the composite slickline into engagement with the sensing element. For example, the system may comprise a spring arrangement, one or more pressure wheels, rollers or the like.

The sensing element may comprise a sheave wheel, guide wheel or the like.

The system may be configured so that the composite slickline engages the sheave wheel.

The system may be configured so that the sheave wheel rotates to accommodate movement of the composite slickline relative to the sheave wheel.

The system may be configured so that the sheave wheel rotates in response to movement of the composite slickline relative to the sheave wheel.

The use of a sheave wheel as a sensing element would serve to eliminate or at least substantially reduce friction between the composite slickline and the sensing element compared with a stationary sensing element. This would result in reduced wear of the composite slickline and/or the sensing element compared with the case of a stationary sensing element. Moreover, such a sensing element would eliminate any requirement to have a separate sheave and a separate sensing element thus providing a more compact wellhead arrangement compared to a wellhead arrangement having a separate sheave and a separate sensing element.

The system may be configured so that the composite slickline engages a portion of an outer surface of the sheave wheel. Such an arrangement may increase a spatial extent of coupling of the electric field between the composite slickline and the sensing element and, therefore, enhance the degree of coupling of the electric field between the composite slickline and the sensing element.

The system may be configured so that the composite slickline extends around an outer surface of the sheave wheel.

The system may be configured so that the composite slickline is wrapped around an outer surface of the sheave wheel.

The system may be configured so that the composite slickline is looped around the sheave wheel.

The system may be configured so that the composite slickline extends around a circumference of the sheave wheel once.

The system may be configured so that the composite slickline extends around the circumference of the sheave wheel more than once. Such an arrangement may increase a spatial extent of coupling of the electric field between the composite slickline and the sensing element and, therefore, enhance the degree of coupling of the electric field between the composite slickline and the sensing element.

The sheave wheel may define a channel in an outer surface thereof, wherein the channel is configured to accommodate or receive the composite slickline. Such an arrangement may increase a spatial extent of coupling of the electric field between the composite slickline and the sensing element and, therefore, enhance the degree of coupling of the electric field between the composite slickline and the sensing element.

The channel may define a generally concave surface profile.

The channel may define a surface profile which is substantially complementary to an outer surface of the composite slickline.

The channel may define a U-shaped surface profile.

The sheave wheel may be partially, substantially or wholly electrically conductive.

The system may comprise a support structure, wherein the sheave wheel is rotatable relative to the support structure.

The sheave wheel may be attached to or integrally formed with an axle or a shaft or the like which is rotatable relative to the support structure.

The support structure may comprise a bearing configured to permit rotation of the sheave wheel relative to the support structure.

The system may comprise an electrical connection arrangement which provides an electrical connection between the sheave wheel and a surface receiver.

The system may comprise an electrical connection arrangement which provides an electrical connection between a surface receiver and an axle which is rotatable with the sheave wheel.

The system may comprise may comprise a slip ring which provides an electrical connection between a surface receiver and an axle which is rotatable with the sheave wheel.

The slip ring may be configured for low-noise performance.

The slip ring may be a mercury-wetted slip ring.

The sheave wheel may comprise a metal.

The sheave wheel may comprise a wear-resistant outer surface region and/or a wear-resistant outer coating.

The sensing element may be partially, substantially or wholly electrically conductive.

The sensing element may comprise a metal.

The sensing element may comprise a semiconductor material.

The sensing element may comprise a wear-resistant outer surface region and/or a wear-resistant coating.

The system may comprise electrically conductive tubing inserted into a bore hole. For example, the system may comprise an electrically conductive tubing string, casing string, liner string, production tubing or the like inserted into the bore hole.

The tool transmitter and the tubing may be electrically coupled.

The tool transmitter and the tubing may be directly electrically coupled. For example, the tool transmitter and the tubing may be in engagement.

The tool transmitter and the tubing may be indirectly coupled.

The tool transmitter and the tubing may be reactively coupled.

The tool transmitter and the tubing may be capacitively coupled.

The tool transmitter and the tubing may be inductively coupled.

The tool transmitter and the tubing may be remotely coupled by the radiation of an electromagnetic signal therebetween.

The tool transmitter and the tubing may be coupled via one or more stabiliser and/or centraliser elements.

The system may comprise a surface enclosure for housing the surface receiver.

The surface enclosure may be capacitively coupled with the tubing. This may result in a variable capacitance between the surface enclosure and the tubing.

The system may comprise a surface capacitor connected between a negative, common or ground node of the surface receiver and the surface enclosure.

The surface capacitor may be connected in series with the variable capacitance between the surface enclosure and the tubing. This may reduce the variation in the total capacitance between the negative, common or ground node of the surface receiver and the tubing. This may result in a reduced dynamic range of a received signal at the surface receiver. This may reduce a dynamic range requirement for a receiver amplifier associated with the surface receiver. This may allow the use of surface receiver amplifier circuitry which is simpler, which consumes less power and/or which is less expensive.

The surface capacitor may be selected to have a value comparable to a minimum value of the variable capacitance between the surface enclosure and the tubing. This may result in a total capacitance between the negative, common or ground node of the surface receiver and the tubing which lies in an approximate range between 0.5 and 1 times the minimum value of the variable capacitance between the surface enclosure and the tubing.

The system may be configured for two-way communication. For example, the system may comprise a tool receiver and a surface transmitter. The surface transmitter may be coupled to the sensing element. The tool transmitter and the tool receiver may form part of a tool transceiver. The surface transmitter and the surface receiver may form part of a surface transceiver.

The surface transmitter may employ frequency shift key (FSK) signalling using a sinusoidal or square wave carrier frequency in the range 2 kHz to 25 kHz.

The surface transmitter may employ an encoding scheme such as Manchester Data encoding as a modulation scheme.

The composite slickline and the sensing element may be capacitively coupled so as to permit transmission of information from the surface transmitter to the tool receiver via the sensing element and the composite slickline.

The system may comprise a tool enclosure for housing the tool receiver.

The tool enclosure may be capacitively coupled with the tubing. For example, the tool enclosure may be capacitively coupled with the tubing via a centraliser. This may result in a variable capacitance between the tool enclosure and the tubing.

The system may comprise a tool capacitor connected between a negative, common or ground node of the tool receiver and the tool enclosure.

The tool capacitor may be connected in series with the variable capacitance between the tool enclosure and the tubing. This may reduce the variation in the total capacitance between the negative, common or ground node of the tool receiver and the tubing. This may result in a reduced dynamic range of a received signal at the tool receiver. This may reduce a dynamic range requirement for a receiver amplifier associated with the tool receiver. This may allow the use of tool receiver amplifier circuitry which is simpler, which consumes less power and/or which is less expensive.

The tool capacitor may be selected to have a value comparable to a minimum value of the variable capacitance between the tool enclosure and the tubing. This may result in a total capacitance between the negative, common or ground node of the tool receiver and the tubing which lies in an approximate range between 0.5 and 1 times the minimum value of the variable capacitance between the tool enclosure and the tubing.

The system may comprise an electrical return path. The return path may extend through the tubing. Such a return path may reduce attenuation or degradation of an electrical signal as the electrical signal propagates along the composite slickline and may, therefore, provide greater signal strength and/or improve the quality of a signal received by the surface receiver. This may provide for downhole communication over a greater distance and/or at a greater speed.

The return path may be provided, or may be at least partially defined by, at least one of a formation around the wellbore, drilling mud, wellbore fluids, and water such as seawater in the wellbore.

The sensing element may be located at or adjacent to a top of the tubing. Such an arrangement may ensure that an electrical signal transmitted along the composite slickline between the tool transmitter and the surface receiver does not degrade or diminish to such an extent that the electrical signal is undetectable at its destination. This is because the composite slickline and the tubing may act in combination as a transmission line or waveguide for the electrical signal to reduce attenuation of the signal and, if the sensing element is located too remotely from the top of the tubing, this may result in excessive attenuation of the electrical signal between the top of the tubing and the sensing element thereby rendering the electrical signal undetectable at the surface receiver.

The system may comprise a return conductor.

The return path may extend through the return conductor.

The return conductor may be electrically connected between the surface receiver enclosure and the tubing.

The return conductor may be electrically connected between the surface receiver enclosure and the tubing at a position at or adjacent to the top end of the tubing.

The return conductor may, for example, comprise an electrically conductive element, member, cable, wire or the like.

The return conductor may comprise a grounding cable.

The system may comprise a grounding stake, an earthing stake or the like for providing an electrically conductive connection to a formation around the wellbore.

The return conductor may be electrically connected to the grounding stake. For example, the return conductor may be electrically connected between the surface receiver enclosure and the grounding stake. This may allow for a return path which extends at least partially through at least one of a formation around the wellbore, drilling mud, wellbore fluids, and water such as seawater in the wellbore.

The sensing element may be attached to, or form part of, a line spooling arm associated with a slickline drum for spooling the composite slickline.

The system may comprise a slickline drum for spooling the composite slickline.

The system may comprise a motor for driving the slickline drum.

The system may comprise a support structure, wherein the slickline drum is rotatable relative to the support structure.

The support structure may comprise a bearing configured to permit rotation of the slickline drum relative to the support structure.

The sensing element may be located on an axis of rotation of the slickline drum.

The slickline drum may be attached to or integrally formed with an axle which is rotatable relative to the support structure.

The axle may be hollow.

The axle may receive or accommodate the sensing element.

An upper end of the composite slickline may extend adjacent to the sensing element.

An upper end of the composite slickline may extend at least partially into or through the sensing element. The sensing element may be static relative to the axle. Thus, the upper end of the composite slickline may rotate inside the sensing element without unduly affecting the capacitive coupling between the composite slickline and the sensing element.

The axle may receive or accommodate the sensing element within a portion of the axle which extends between flanges of the slickline drum.

The axle may receive or accommodate the sensing element within a portion of the axle which extends to one side of the slickline drum.

A communication method comprises:

mechanically and electrically coupling a downhole tool to a composite slickline which extends from the downhole tool to a sensing element;

capacitively coupling the sensing element and the composite slickline; and transmitting information between the downhole tool and the sensing element via the composite slickline.

The method may comprise locating the sensing element at surface.

The method may comprise running the downhole tool into the wellbore using the composite slickline The composite slickline may comprise an electrical conductor.

The composite slickline may comprise an electrically insulating structural material.

The electrically insulating structural material may surround the electrical conductor.

The steps of capacitively coupling the sensing element and the composite slickline and running the downhole tool into the wellbore using the composite slickline may at least partially overlap.

The steps of capacitively coupling the sensing element and the composite slickline and running the downhole tool into the wellbore using the composite slickline may be performed in any order.

The method may comprise transmitting information from a downhole transmitter of the downhole tool to a surface receiver.

The surface receiver may be coupled to the sensing element.

The method may comprise capacitively coupling the composite slickline and the sensing element so as to permit relative movement therebetween.

The method may comprise transmitting an electrical signal along the composite slickline so as to generate a electrical signal in the sensing element.

The method may comprise transmitting a voltage signal along the composite slickline so as to generate a voltage signal in the sensing element.

The method may comprise receiving an electrical signal, for example a voltage signal, from the sensing element at a surface receiver.

The method may comprise detecting an electrical signal, for example, a voltage signal from the sensing element at a surface receiver.

The method may comprise amplifying an electrical signal, for example, a voltage signal from the sensing element at a surface receiver.

The method may comprise transmitting a frequency shift key (FSK) modulated sinusoidal or square wave carrier frequency in the range 2 kHz to 25 kHz along the slickline.

The method may comprise employing an encoding scheme such as Manchester Data encoding as a modulation scheme.

The method may comprise:
coupling a surface transmitter to the sensing element;
coupling a downhole receiver to the composite slickline; and
transmitting information from the surface transmitter to the downhole receiver via the sensing element and the composite slickline.

The method may comprise:
determining a frequency of data received by the surface receiver from the downhole transmitter; and
transmitting data from the surface transmitter to the downhole receiver at the determined data frequency.

A communication system comprises:
a downhole tool;
a sheave; and
a composite slickline,
wherein the composite slickline is mechanically and electrically coupled to the downhole tool and the composite slickline extends from the downhole tool and passes around the sheave so as to permit the transmission of information between the downhole tool and the sheave via the composite slickline.

The composite slickline may comprise an electrical conductor.

The sensing element may be located at surface.

The downhole tool may be located in a wellbore.

The composite slickline may comprise an electrical conductor.

The composite slickline may comprise an electrically insulating structural material.

The electrically insulating structural material may surround the electrical conductor.

The composite slickline and the sheave may be capacitively coupled.

The composite slickline and the sheave may be capacitively coupled so as to permit an electric field to extend from the electrical conductor of the composite slickline to the sheave.

A communication method comprises:
mechanically and electrically coupling a downhole tool to a composite slickline which extends from the downhole tool;
passing the composite slickline around a sheave; and
transmitting information between the downhole tool and the sheave via the composite slickline.

The method may comprise locating the sheave at surface.

The method may comprise running the downhole tool into the wellbore using the composite slickline The composite slickline may comprise an electrical conductor.

The composite slickline may comprise an electrically insulating structural material.

The electrically insulating structural material may surround the electrical conductor.

The method may comprise capacitively coupling the composite slickline and the sheave.

The method may comprise capacitively coupling the composite slickline and the sheave so as to permit an electric field to extend from the electrical conductor of the composite slickline to the sheave.

The method may comprise transmitting an electrical signal along the composite slickline so as to generate an electrical signal in the sheave.

The method may comprise transmitting a voltage signal along the composite slickline so as to generate a voltage signal in the sheave.

The method may comprise receiving an electrical signal, for example, a voltage signal from the sheave at a surface receiver.

The method may comprise detecting an electrical signal, for example, a voltage signal from the sheave at a surface receiver.

The method may comprise amplifying an electrical signal, for example, a voltage signal from the sheave at a surface receiver.

A composite slickline comprises an electrical conductor and an electrically insulating structural material.

The electrical conductor may be configured for the transfer of electrical and/or electromagnetic signals along the composite slickline. The electrical conductor may be configured for the transfer of electrical power along the composite slickline.

The composite slickline may be configured to have a resistance of between 10 and 100 ohm/km, a resistance of between 30 and 50 ohm/km or a resistance of approximately 40 ohm/km. For example, the electrical conductor may be configured to provide the composite slickline with a resistance of between 10 and 100 ohm/km, a resistance of between 30 and 50 ohm/km, or a resistance of approximately 40 ohm/km.

The electrical conductor may comprise a metal.

The electrical conductor may comprise copper, steel, aluminium or the like.

The electrical conductor may have a diameter of between 0.1 and 1.0 mm, a diameter of between 0.2 and 0.4 mm, or a diameter of approximately 0.3 mm. The electrical conductor may have a diameter of 0.32 mm.

The electrical conductor may comprise a plurality of electrically conductive strands, wherein each strand is in electrical contact with each of the other strands.

The electrically conductive strands may, for example, be twisted together to form a twisted electrical conductor.

The electrical conductor may comprise a central strand and one or more outer strands twisted around the central strand. For example, the electrical conductor may comprise a central strand and six outer strands twisted around the central strand.

Each strand may comprise a metal. For example, each strand may comprise copper, steel, aluminium or the like.

Each strand may have a diameter of between 0.1 and 1.0 mm, a diameter of between 0.2 and 0.4 mm, or a diameter of approximately 0.3 mm. Each strand may have a diameter of 0.32 mm.

The composite slickline may comprise a plurality of electrical conductors. Each electrical conductor may be electrically insulated from each of the other electrical conductors. For example, each electrical conductor may be coated or may be embedded within an electrically insulating matrix material.

The electrically insulating structural material may surround the electrical conductor.

The electrically insulating structural material may be configured to provide the composite slickline with mechanical strength whilst insulating the electrical conductor from an environment external to the composite slickline.

The electrically insulating structural material may be provided in one or more layers.

The electrically insulating structural material may comprise an electrically insulating composite material.

The electrically insulating composite material may be configured to provide the composite slickline with mechanical strength whilst insulating the electrical conductor from an environment external to the composite slickline.

The composite material may comprise a plurality of reinforcing elements embedded in a matrix material.

Such a composite slickline may have a lower weight and/or a higher strength than a conventional insulating slickline. This may enable the use of longer lengths of composite slickline compared with conventional slickline. Such a composite slickline may, for example, be used to mechanically propel a reciprocating tool tractor down into a horizontal well over further distances and/or provide for safer pull-back of the reciprocating tool tractor.

The composite slickline may provide improved electrical insulation of the electrical conductor compared with a conventional insulated or coated slickline. This may enable use of the composite slickline in open-hole situations in the absence of an electrically conductive tubular such as an electrically conductive casing through which a downhole tool may run and through which the composite slickline may extend. The improved electrical insulation provided by the composite slickline reduces the effect of the wellbore environment on the signal transmission properties of the composite slickline. The electrical insulation provided by the composite slickline may be sufficient to permit a signal return path to be formed, or to be at least partially defined by, at least one of a formation around the wellbore, drilling mud and wellbore fluids such as water, for example, seawater in the wellbore.

The matrix material may be compliant or elastomeric, facilitating distribution of load between the reinforcing elements.

The matrix material may comprise a thermoplastic material, such as a PEEK material. The use of thermoplastic material, having a degree of resilience, tends to improve the bend radius of the member, facilitating use of the member with apparatus and methods originally intended for use with relatively flexible metallic members such as conventional slickline and wireline. The matrix material may comprise an elastomer, for example a perfluoroelastomeric material such as sold under the Kalrez trademark. In other embodiments the matrix may be a thermosetting material, LCP or Polyamide 46 (Stanyl).

The reinforcing elements may be electrically non-conductive.

The reinforcing elements may be non-metallic.

The reinforcing elements may comprise fibres.

The reinforcing elements may comprise monofilaments.

The reinforcing elements may comprise at least one of a para-aramid material, a meta-aramid material, a glass, PBO, liquid crystal polymer (LCP) and carbon.

The reinforcing elements may comprise a material sold under at least one of the trademarks Kevlar, Zylon, 12k Thornel, Twaron and E-glass.

The reinforcing elements may be configured, for example, oriented so as to provide strength in one or more preferred directions.

At least some of the reinforcing elements may be continuous. At least some of the reinforcing elements may extend along the entire length of the composite slickline. At least some of the reinforcing elements may extend along a significant proportion of the length of the composite slickline.

At least some of the reinforcing elements may extend solely longitudinally, that is parallel to an axis of the composite slickline with little or no twisting or weaving. Thus, when in tension, each reinforcing element will tend not to cut across other reinforcing elements.

At least some of the reinforcing elements may be oriented at an angle to the axis of the composite slickline.

At least some of the reinforcing elements may be oriented at a first angle to the axis of the composite slickline and at least some of the reinforcing elements may be oriented at a second angle to the axis of the composite slickline.

The first and second angles may have the same sign or a different sign.

The first and second angles may have the same magnitude or a different magnitude.

At least some of the reinforcing elements may be oriented in a substantially circumferential direction.

The composite slickline may comprise an enamel coating. For example, the composite slickline may comprise a coating comprising polyester, polyamide, polyamide-imide, polycarbonates, polysulfones, polyester imides, polyether ether ketone, polyurethane, nylon, epoxy, equilibrating resin, alkyd resin, theic polyester, or the like or any combination thereof.

The composite slickline may include a sleeve or coating around the electrically insulating structural material. The coating may provide abrasion resistance for the composite slickline, protecting the electrically insulating structural material from damage. The coating may be visually distinguishable from the electrically insulating structural material, for example the coating may be a different colour from the electrically insulating structural material, to facilitate identification of wear of the coating. The coating may be compatible with the matrix material, and may be the same or a similar material to the matrix material. The coating may comprise materials selected to enhance tribological or electrostatic dissipative properties, for example the coating may comprise one or more of graphite, short para/meta-aramid fiber, CNFs, TiC and ceramics.

The composite slickline may have an outer diameter of between 3 mm and 7 mm, an outer diameter of between 4 mm and 6 mm, or an outer diameter of approximately 5 mm.

The composite slickline may have a weight of between 21 kg/km and 41 kg/km, a weight of between 26 kg/km and 36 kg/km, or a weight of approximately 31 kg/km.

The composite slickline may have a minimum breaking load (MBL) of 1700 to 3700 kg, a MBL of 2500 to 2900 kg, or an approximate MBL of 2700 kg.

The composite slickline may comprise one or more optical fibres.

The composite slickline may comprise one or more hydraulic control lines.

A communication system is described herein, comprising:
  a composite slickline including an electrical conductor surrounded by an electrically insulating structural material;
  a downhole tool; and
  a sensing element,
  wherein the composite slickline is mechanically and electrically coupled to the downhole tool and extends from the downhole tool to the sensing element, and
  wherein the composite slickline and the sensing element are capacitively coupled so as to permit relative movement therebetween and so as to permit an electric field to extend from the electrical conductor of the composite slickline to the sensing element through the electrically insulating structural material of the composite slickline for the transmission of an electrical and/or an electromagnetic signal between the downhole tool and the sensing element via the composite slickline.

A communication method is described herein, comprising:
  mechanically and electrically coupling a downhole tool to a composite slickline which includes an electrical conductor surrounded by an electrically insulating structural material and which extends from the downhole tool to a sensing element;
  capacitively coupling the sensing element and the composite slickline so as to permit relative movement therebetween and so as to permit an electric field to extend from the electrical conductor of the composite slickline to the sensing element through the electrically insulating structural material of the composite slickline; and
  transmitting an electrical and/or an electromagnetic signal between the downhole tool and the sensing element via the composite slickline.

BRIEF DESCRIPTION OF THE DRAWINGS

Communication systems and methods and composite slicklines will now be described, by way of example only, with reference to the accompanying drawings, of which.

DETAILED DESCRIPTION OF THE DRAWINGS

Figure 1:
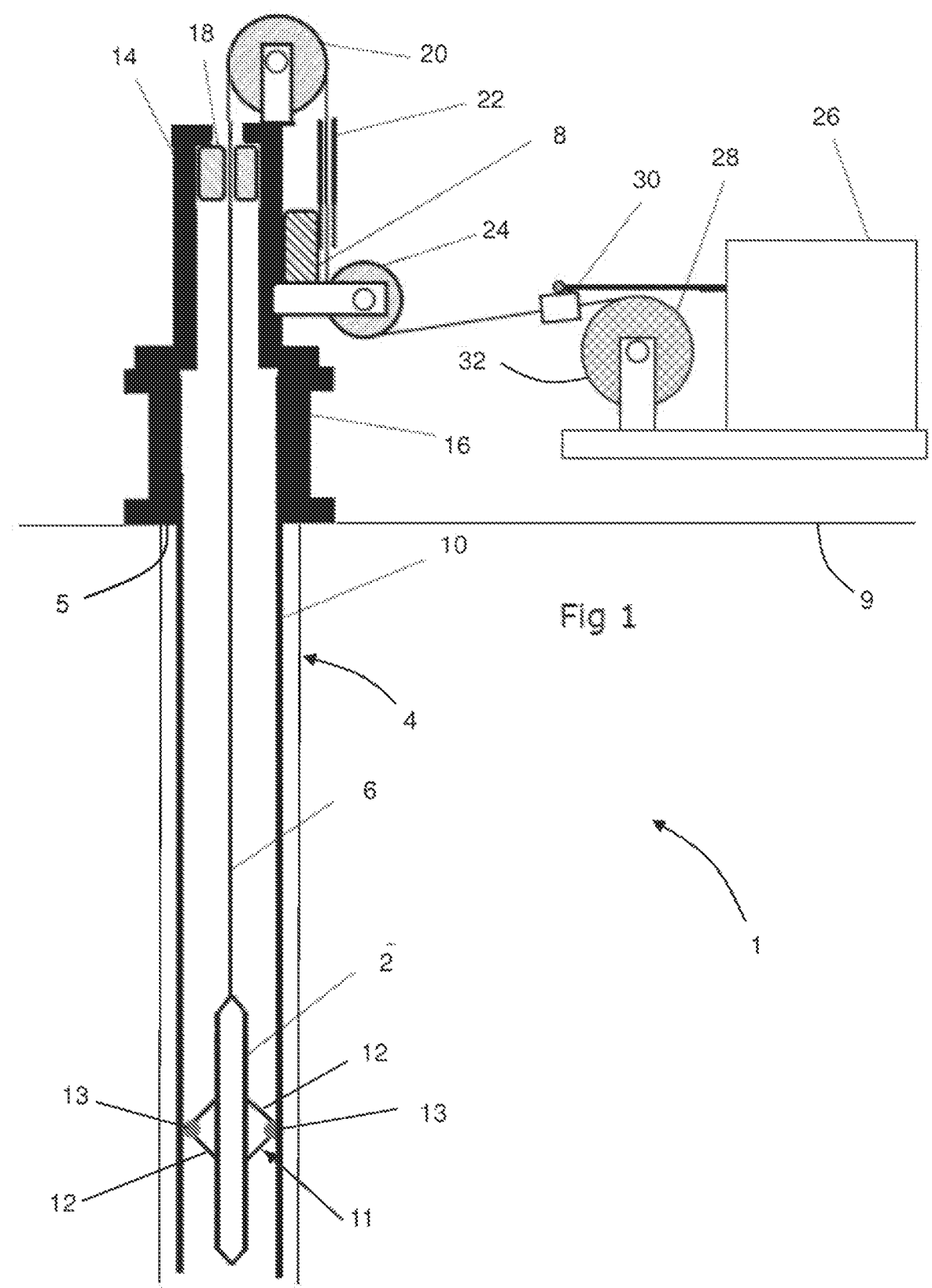
FIG. 1 shows a first wellbore communication system.

Referring initially to FIG. 1, there is shown a first wellbore communication system generally designated 1 comprising a downhole tool 2 located within a wellbore 4, a composite slickline 6 and a surface transceiver (not shown in FIG. 1) located within a surface transceiver enclosure 8 above or adjacent a surface 9. It should be understood that the surface 9 may represent a ground or seabed surface or a surface of a platform or the like mounted above a ground or seabed surface. An opening 5 of the wellbore 4 is located at the surface 9.

Figure 14:
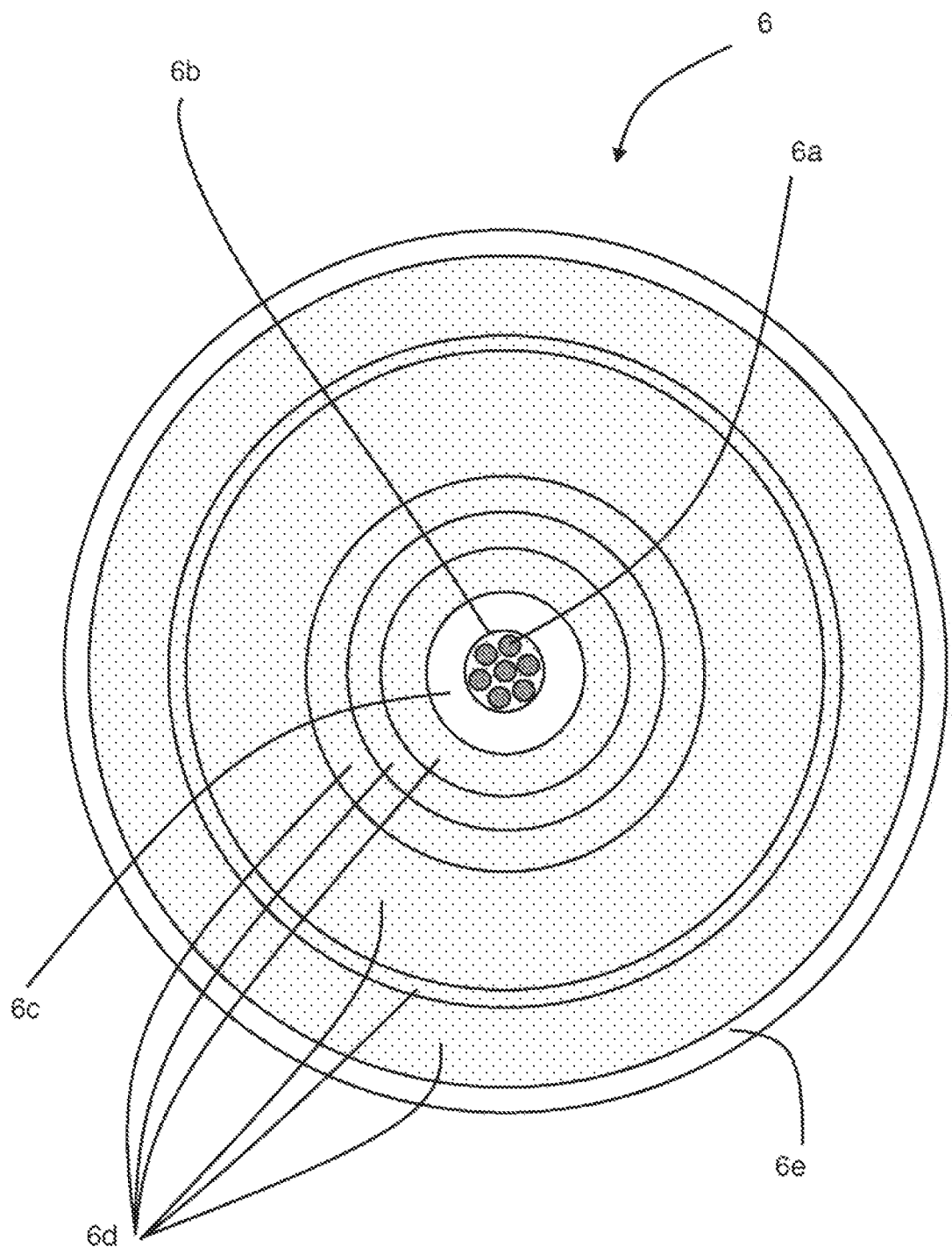
FIG. 14 is a schematic cross-section of a composite slickline.

As shown in FIG. 14, the composite slickline 6 comprises an electrical conductor 6a in the form of seven twisted copper strands. Each copper strand is approximately 0.32 mm in diameter. The electrical conductor 6a is surrounded by an electrically insulating composite material 6b in the form of Kevlar reinforcing elements embedded in a layer of PEEK matrix material. The electrically insulating composite material 6b is surrounded by a layer of PEEK 6c. The layer of PEEK is surrounded by several layers 6d of an electrically insulating composite material formed from Kevlar reinforcing elements embedded in a PEEK matrix material.

The electrically insulating composite material of the layers 6d is covered by an abrasion resistant coating layer 6e which may comprise polyester, polyamide, polyamide-imide, polycarbonates, polysulfones, polyester imides, polyether ether ketone, polyurethane, nylon, epoxy, equilibrating resin, alkyd resin, theic polyester, or the like or any combination thereof. The outer diameter of the composite slickline 6 is approximately 5 mm.

Although not shown in FIG. 1, it should be understood that the downhole tool 2 includes a downhole transceiver to be described in more detail below.

As will be described in more detail below, the composite slickline 6 is mechanically coupled to the downhole tool 2. In use, the composite slickline 6 may be used to run the downhole tool 2 into and out of the wellbore 4. The composite slickline 6 is also electrically coupled to the downhole transceiver within the downhole tool 2. The wellbore communication system 1 further comprises an elongated tubular sensing element 22 which is capacitively coupled to the composite slickline 6 so that, in use, an electrical field extends between the sensing element 22 and the electrical conductor of the composite slickline 6 for the transfer of a voltage signal therebetween. The elongation of the sensing element 22 provides a greater effective surface area for enhanced capacitive coupling between the sensing element 22 and the composite slickline 6. The sensing element 22 extends around the composite slickline 6 whilst allowing the composite slickline 6 to run freely therethrough. The tubular sensing element 22 is constructed in two halves which are configured for assembly to form the tubular sensing element 22 around the composite slickline 6. In use, the composite slickline 2 conveys signals between the downhole transceiver within the downhole tool 2 and the surface transceiver within the surface transceiver enclosure 8 via the sensing element 22.

As will be described in more detail below, an electrically conductive tubing string in the form of an electrically conductive casing string 10 is installed within the wellbore 4. The wellbore communication system 1 comprises a centraliser 11 for centralising the downhole tool 2 within the casing string 10 similar to well-known electric line centralisers. The centraliser 11 comprises electrically conductive arms 12 and a contact head 13 at a distal end of each arm 12 for engaging the casing string 10.

A stuffing box 14 is mounted on a wellhead member 16 located at or adjacent surface 9. The stuffing box 14 comprises flow tubes 18 which fit closely around the composite slickline 6 and serve to form a pressure seal to prevent the escape of well fluids from the wellbore 4. The stuffing box 14, and the wellhead member 16 are electrically conductive. The surface transceiver enclosure 8 is mounted on the stuffing box 14. The sensing element 22 is mounted on the surface transceiver enclosure 8 but is electrically insulated therefrom.

The composite slickline 6 runs over an upper sheave wheel 20 and then through the sensing element 22 before running round a lower sheave wheel 24 on the way to a slickline unit generally designated 26. The slickline unit 26 includes a motor driven cable drum 28 for spooling the composite slickline 6 and hence raise and lower the downhole tool 2 within the wellbore 4. The slickline unit 26 also includes a steerable arm 30 for controlling spooling of the composite slickline 6 onto the drum 28. An upper end of the composite slickline 6 is fitted with an insulating cover (not shown) and located inside the drum 28. The slickline unit 26 may be a standard slickline unit, as used with conventional uncoated slickline, as no arrangements are required for an electrical connection to the composite slickline 6. The drum 28 comprises drum flanges 32 having nylon protection plates mounted thereon for mechanical protection of the insulating coating of the composite slickline 6.

Figure 2:
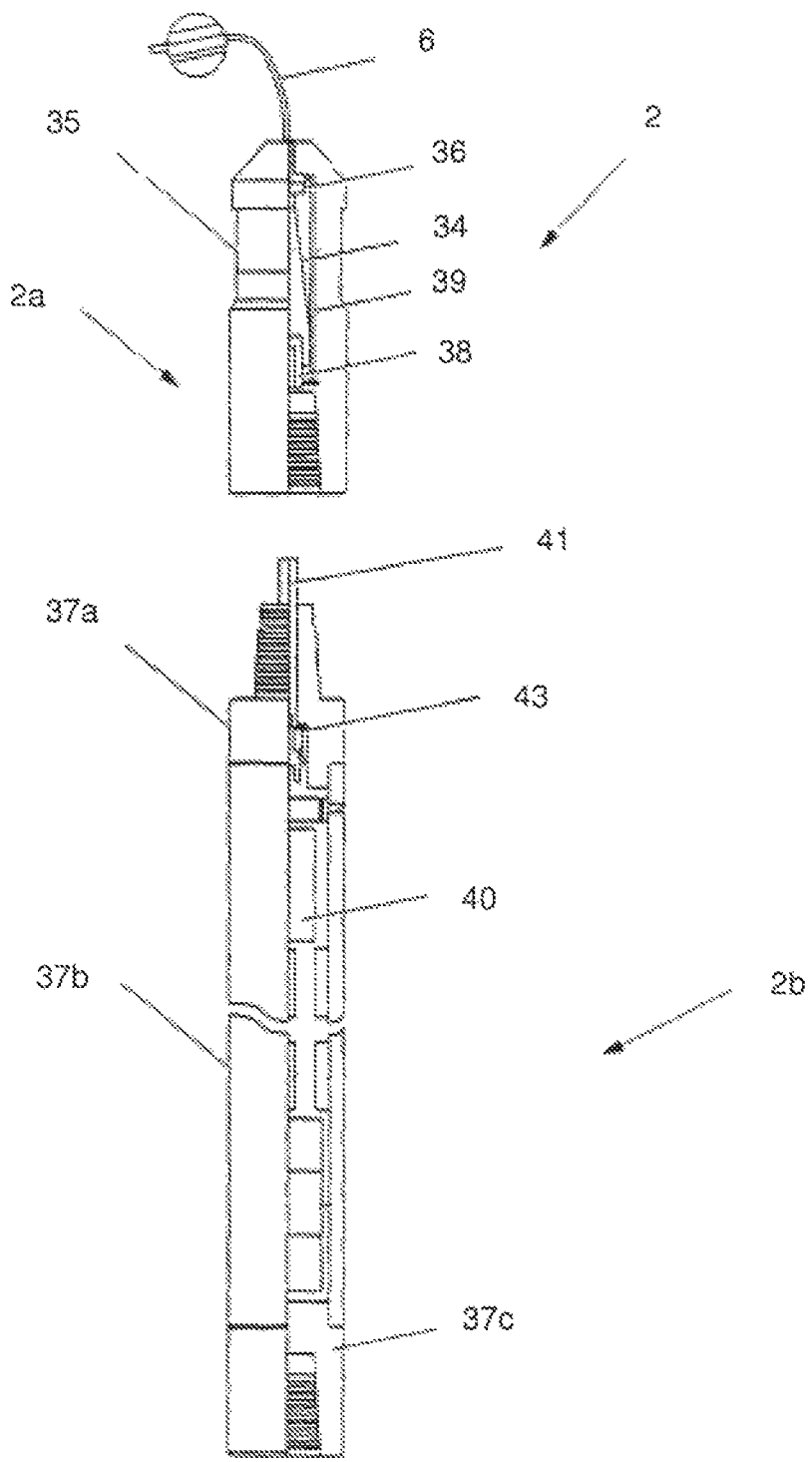
FIG. 2 is a part cross-section of a downhole tool of the first wellbore communication system of FIG. 1.

As shown in FIG. 2, the composite slickline 6 is coupled at a lower end thereof to a termination assembly generally designated 2a of the downhole tool 2. The termination assembly 2a provides a mechanical connection and an electrical connection between the composite slickline 6 and the downhole tool 2. The mechanical connection is provided by the self-tightening arrangement shown in FIGS. 15(a) and 15(b) which includes a wedge 34 which engages in a correspondingly tapered retaining sleeve 35. The retaining sleeve 35 is housed within an insulating sleeve 39. The wedge 34 comprises two cone halves 34a, 34b. As illustrated in FIG. 15(b), the cone halves 34a, 34b together define a square-section passage 34c. Each of the cone halves 34a, 34b is fitted with a respective dowel pin 34d, 34e which is configured to engage a respective socket 34f, 34g formed in the other cone half 34b, 34a. Such a dowel pin and socket arrangement permits separation of the cone halves 34b, 34a to allow the composite slickline 6 to be placed in the passage 34c and serves to align the cone halves 34a, 34b co-axially when the cone halves 34a, 34b are placed directly together as shown in FIGS. 15(a) and 15(b).

Figure 15A:
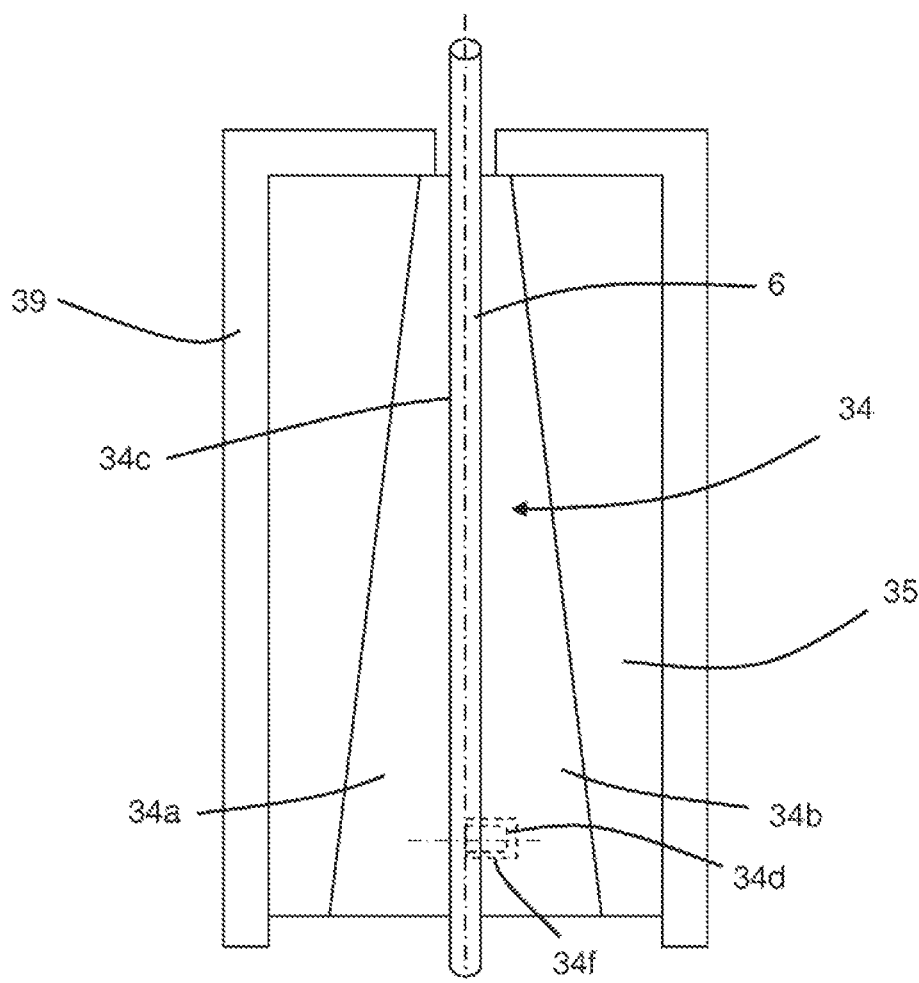
FIG. 15(a) is a schematic cross-section of a composite slickline gripped within a self-tightening arrangement.
Figure 15B:
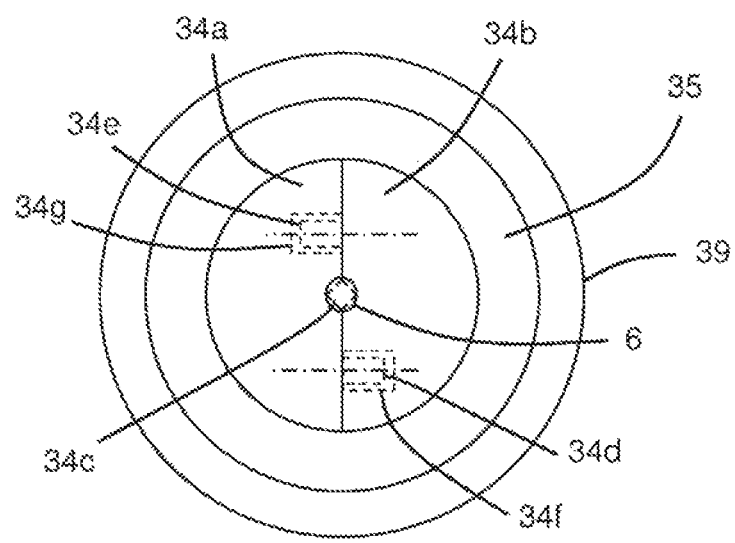
FIG. 15(b) is a schematic end view of the self-tightening arrangement and the composite slickline of FIG. 15(a).

The self-tightening arrangement of FIGS. 15(a) and 15(b) thus allows the composite slickline 6 to be terminated without requiring bending of the composite slickline 6. The composite slickline 6 is substantially incompressible, but the degree of compliance of the composite slickline 6 allows the composite slickline 6 to be deformed and engage the walls of the passage 34c. The self-tightening arrangement of FIGS. 15(a) and 15(b) is configured with reference to Poisson's ratio of the composite slickline 6, that is the ratio in the composite slickline 6, of the transverse strain to the longitudinal strain. In use, the composite slickline 6 may experience some elongation. This elongation may be accompanied by a reduction in cross-section of the composite slickline 6. The self-tightening arrangement of FIGS. 15(a) and 15(b) is configured to grip or clamp the composite slickline 6 sufficiently tightly such that the composite slickline 6 will remain securely retained in the self-tightening arrangement under maximum load even when this is accompanied by a tendency for the cross-section of the composite slickline 6 to reduce.

Referring to FIG. 2 again, the termination assembly 2a comprises a seal or gasket 36 which seals around the composite slickline 6 to isolate the termination assembly 2a from the well environment around the composite slickline 6.

The main portion 2b of the downhole tool 2 typically comprises an upper sub 37a, an intermediate sub 37b, and a lower sub 37c. Each of the upper, intermediate and lower subs 37a, 37b, and 37c is coupled to the adjacent sub by a threaded connection. It should be understood that the centraliser 11 is not shown in FIG. 2.

The upper sub 37a comprises a screw thread, typically in the form of a pin, which engages with a corresponding internal screw thread, typically in the form of a box, on the termination assembly 2a. These threaded connections allow the termination assembly 2a and main portion 2b of the downhole tool 2 to be mechanically coupled together. The upper sub 37a further comprises a downhole transceiver 40 for communicating with a surface transceiver (not shown in FIG. 2) via the composite slickline 6.

The termination assembly 2a comprises an electrical terminal 38 which couples the electrical conductor 6a of the composite slickline 6 and the downhole transceiver 40. The electrical terminal 38 is electrically isolated from the body of the termination assembly 2a by the insulating sleeve 39.

The upper sub 37a of the main portion 2b of the downhole tool 2 comprises an electrical pin or contact plunger 41 which is spring-loaded so that it can move longitudinally with respect to a longitudinal axis of the downhole tool 2. A lower end of the contact plunger 41 is in contact with a main contactor 43 which is electrically coupled to the downhole transceiver 40. When the termination assembly 2a and the main portion 2b of the downhole tool 2 are screw coupled, the contact plunger 41 engages the electrical terminal 38 within the termination assembly 2a to facilitate communication between the downhole transceiver 40 and a surface transceiver (not shown in FIG. 2) through the plunger 41, the terminal 38 and the composite slickline 6.

Figure 3:
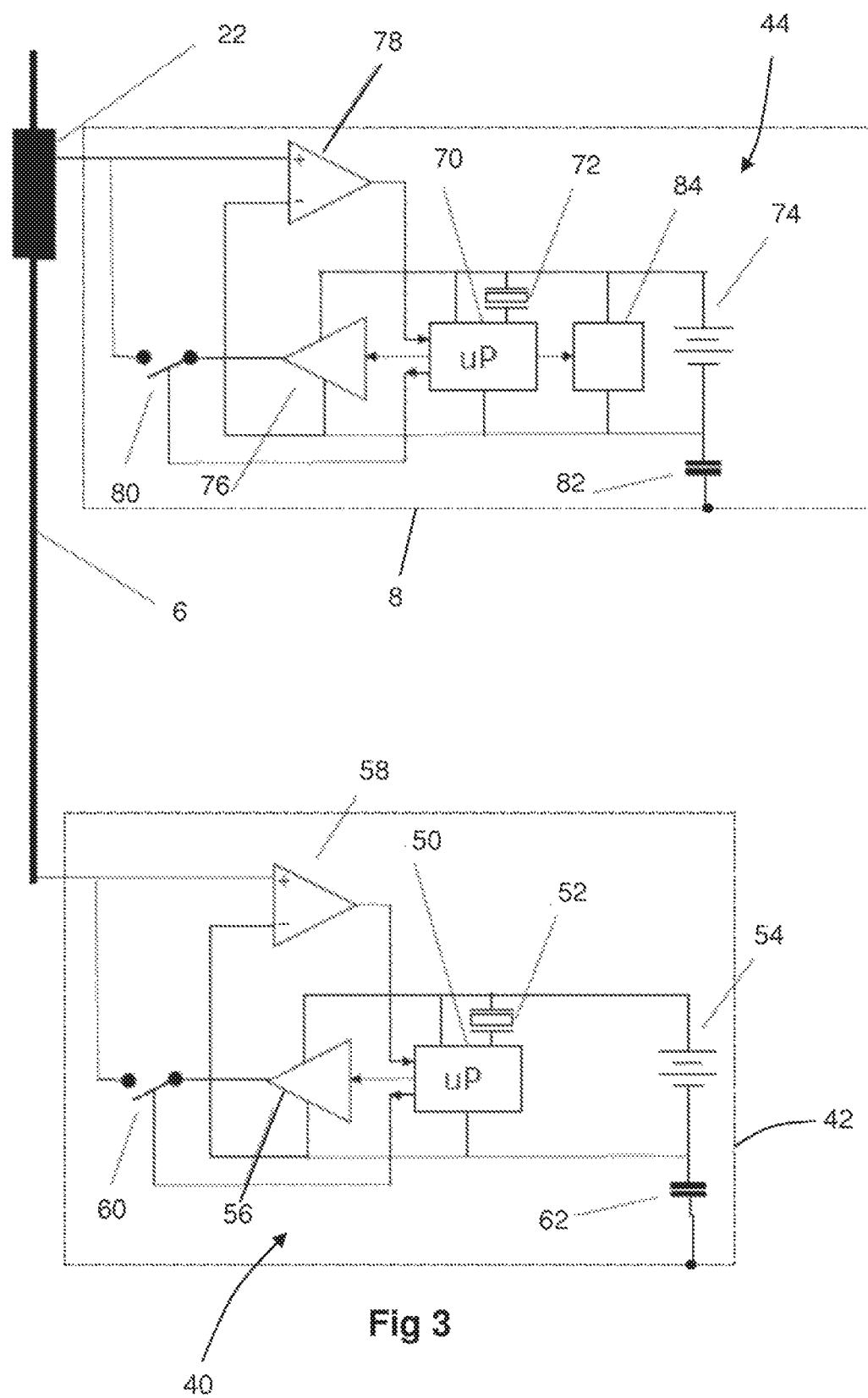
FIG. 3 shows surface transceiver electronics and downhole transceiver electronics of the first wellbore communication system of FIG. 1.

FIG. 3 illustrates the electrical connectivity between the downhole transceiver 40 and the surface transceiver which is generally designated 44. The composite slickline 6 provides an electrically conductive path between the sensing element 22 and the downhole transceiver 40. The downhole transceiver 40 is located within an enclosure 42 of the downhole tool 2. The surface transceiver 44 is located within the surface transceiver enclosure 8. As shown in FIG. 3, the sensing element 22 is electrically connected to the surface transceiver 44. The sensing element 22 is electrically insulated from the casing string 10, the stuffing box 14, the wellhead member 16 and the electrical conductor of the composite slickline 6.

The electrically conductive arms 12 of the centraliser 11 shown in FIG. 1 are electrically connected to the enclosure 42 of the downhole tool 2. The enclosure 42 of the downhole tool 2 is capacitively coupled to the casing string 10 via the arms 12 and the contact head 13 of the centraliser 11. The magnitude of the capacitance between the enclosure 42 of the downhole tool 2 and the casing string 10 varies according to the material properties of the contact heads 13 and the casing string 10, the proximity of the contact head 13 to the casing string 10, and the nature or degree of any physical contact between the contact heads 13 and the casing string 10. Similarly, a capacitance exists between the surface transceiver enclosure 8 and the casing string 10 which depends on the nature of the electrical connections between the surface transceiver enclosure 8 and the casing string 10 via the stuffing box and the wellhead member 16. Although not shown explicitly in FIG. 3, it should be understood that as a consequence of the capacitive coupling between the enclosure 42 of the downhole tool 2 and the casing string 10 and the capacitive coupling between the surface receiver enclosure 8 and the casing string 10, an electrical return path is provided between the surface transceiver enclosure 8 and the enclosure 42 of the downhole tool 2 through the stuffing box 14, the wellhead member 16 and the casing string 10. Such an electrical return path may reduce noise and therefore permit improved communications between the downhole and surface transceivers 40, 44. For example, the electrical return path may permit communications between the downhole and surface transceivers 40, 44 at greater speeds and/or over greater distances.

The downhole transceiver 40 comprises a downhole processor in the form of a downhole microprocessor 50, a downhole timing crystal 52, a downhole power source in the form of a downhole battery 54, a downhole transmitter amplifier 56, a downhole receiver amplifier 58 and a downhole solid state switch 60. The downhole microprocessor 50 comprises a downhole transmitter which is capable of transmitting a signal to the downhole transmitter amplifier 56. Similarly, the downhole microprocessor 50 comprises a downhole receiver which is capable of receiving a signal from the downhole receiver amplifier 56. The downhole receiver amplifier 58 is a high gain amplifier circuit implemented in several stages with low pass and high pass RC network filters at the input and between the stages. The downhole receiver amplifier 58 comprises two programmable amplifiers which provide a total gain of up to 1000. Reference is made, for example, to Maxim Data Sheet 19-4329 Rev 2 12/10 "SPI Programmable-Gain Amplifier with input Vos Trim and Output Op Amp", which is incorporated herein by way of reference. The microprocessor 50 varies the programmable gain of the receiver amplifier 58 according to the magnitude of a signal received from the surface transceiver 44.

The downhole transceiver 40 is powered by the downhole battery 54. The downhole transceiver 40 further comprises a downhole capacitor 62 which connects the negative side of the downhole battery 54 to the enclosure 42 of the downhole tool 2. The downhole capacitor 62 and the variable capacitance between the enclosure 42 of the downhole tool 2 and the casing string 10 are connected in series between the negative side of the downhole battery 54 and the casing string 10. The downhole capacitor 62 is selected to have a value comparable to a minimum value of the variable capacitance between the enclosure 42 of the downhole tool 2 and the casing string 10. This results in a total capacitance between the negative, common or ground node of the surface receiver and the tubing which lies in an approximate range between 0.5 and 1 times the minimum value of the variable capacitance between the enclosure 42 of the downhole tool 2 and the casing string 10. In effect, the presence of the downhole capacitor 62 greatly reduces the variation in the total capacitance between the negative side of the downhole battery 54 and the casing string 10 and therefore also reduces the dynamic range of the signal received at the downhole receiver amplifier 58 from the surface transceiver 44. Consequently, the presence of the downhole capacitor 62 may reduce the variation of the programmable gain required at the downhole receiver amplifier 58.

Similarly, the surface transceiver 44 comprises a surface processor in the form of a surface microprocessor 70, a surface timing crystal 72, a surface power source in the form of a surface battery 74, a surface transmitter amplifier 76, a surface receiver amplifier 78 and a surface solid state switch 80. The surface microprocessor 70 comprises a surface transmitter which is capable of transmitting a signal to the surface transmitter amplifier 76. Similarly, the surface microprocessor 70 comprises a surface receiver which is capable of receiving a signal from the surface receiver amplifier 76. The surface receiver amplifier 78 is a high gain amplifier circuit implemented in several stages with low pass and high pass RC network filters at the input and between the stages. The surface receiver amplifier 78 comprises two programmable amplifiers which provide a total gain of up to 1000.

The surface transceiver 44 is powered by the surface battery 74. The surface transceiver 44 further comprises a surface capacitor 82 which connects the negative side of the surface battery 74 to the surface transceiver enclosure 8. The surface capacitor 82 and the capacitance between the surface transceiver enclosure 8 and the casing string 10 are connected in series between the negative side of the surface battery 74 and the casing string 10. The surface capacitor 82 is selected to have a value comparable to a minimum value of the capacitance between the surface transceiver enclosure 8 and the casing string 10. In effect, the presence of the surface capacitor 82 greatly reduces the total capacitance between the negative side of the surface battery 74 and the casing string 10 and therefore also the dynamic range of the signal received at the surface receiver amplifier 78 from the downhole transceiver 40. Consequently, the presence of the surface capacitor 82 may reduce the variation of the programmable gain required at the surface receiver amplifier 78.

In addition, the surface transceiver 44 comprises a wireless transceiver in the form of a radio module 84 which is configured for communication with the microprocessor 70 and for wireless communication with a remote user interface such as a remote computer (not shown) which is configured to store data received from the radio module 84 and/or to display the data to a user. The remote user interface may, for example, be configured to display the received data to the user in real time and/or may be configured to process the received data and present the user with information derived from the received data.

In use, as explained in more detail below, when it is desired to transmit a signal from the downhole transceiver 40 to the surface transceiver 44, the downhole microprocessor 50 closes the downhole switch 60 (if switch 60 is not already closed), the surface microprocessor 70 opens the surface switch 80 (if switch 80 is not already opened) and the downhole microprocessor 50 transmits a signal to the surface microprocessor 70 via the downhole transmitter amplifier 56, the downhole switch 60, the composite slickline 6, the sensing element 22 and the surface receiver amplifier 78. The surface microprocessor 70 may then communicate data representative of the received signal to the remote user interface (not shown) via the radio module 84.

Conversely, when it is desired to transmit a signal from the surface transceiver 44 to the downhole transceiver 40, the surface microprocessor 70 closes the surface switch 80 (if switch 80 is not already closed), the downhole microprocessor 50 opens the downhole switch 60 (if switch 60 is not already opened) and the surface microprocessor 70 transmits a signal to the downhole microprocessor 50 via the surface transmitter amplifier 76, the surface switch 80, the sensing element 22, the composite slickline 6 and the downhole receiver amplifier 58.

In more detail, the downhole transceiver 40 communicates with the surface transceiver 44 by first sending a message, then listening for a response, according to the following method. Each timing crystal 52, 72 provides a timing signal to the corresponding microprocessor 50, 70 which uses the timing signal to derive a data clock frequency. The microprocessors 50, 70 employ FSK signalling using a sinusoidal or square wave carrier frequency in the range 2 kHz to 25 kHz. An encoding scheme such as Manchester Data encoding is used as a modulation scheme. This scheme avoids long strings of "ones" or "zeros" and has the encoding clock embedded in it. Reference is made for example to Maxim Application note 3435 "Manchester Data Encoding for Radio Communications, Jan. 26, 2005, which is incorporated herein by way of reference. A typical data rate is 300 baud (up and down).

The downhole microprocessor 50 receives digital information such as production logging data from the downhole tool 2 by well-known means. This data is assembled into a data packet, with error detection data, such as a checksum. The downhole microprocessor 50 closes the downhole switch 60 and transmits the data onto composite slickline 6 via downhole amplifier 56. The data is received by the surface microprocessor 70 via tubular sensing element 22 and the programmable gain surface receiver amplifier 78. The surface microprocessor 70 decodes the data and transmits data in an appropriate format to the remote computer (not shown) via the low power radio module 84.

Once the downhole microprocessor 50 has finished sending the data packet, it opens downhole switch 60, removing the output impedance of downhole transmitter amplifier 56 from the line. The downhole microprocessor 50 now listens for a data packet coming from the surface transceiver 44 via composite slickline 6. The encoding scheme and frequency used by the surface transceiver 44 is identical to the one used by the downhole transceiver 40. The amplified signal from the downhole receiver amplifier 58 is digitised by the downhole microprocessor 50 and digitally filtered using well known means. A suitable digital filter algorithm is the sliding Goertzel filter. Reference is made for example to "Streamlining digital signal processing: a tricks of the trade guidebook" Chapter 14, Richard G. Lyons, which is incorporated herein by way of reference. Once the downhole microprocessor 50 has decoded the incoming data packet it then acts on the command from the surface. Typical commands depend on the downhole tool 2 connected to the downhole transceiver 40, but for a production logging string, the sample rate of the tool may be selected, or the tool may be switched on or off, to save battery power.

It is important for effective decoding and filtering that the downhole transceiver 40 and the surface transceiver 44 have very accurately matched encoding/decoding frequencies. However, the temperature downhole can be considerably higher than surface temperatures, and this causes the frequency of the downhole crystal 52 to change with respect to the frequency of the surface crystal 72. To compensate for this, the surface microprocessor 70 precisely measures the frequency of the data received from the downhole microprocessor 50 using a first precision counter/timer module within the surface microprocessor 70. The data transmission frequency of the surface microprocessor 70 is generated by a second counter/timer module within the surface microprocessor 70 which is digitally adjusted to so that the frequency of data transmitted by the surface microprocessor 70 exactly matches the frequency of data received by the surface microprocessor 70. This enables the downhole microprocessor 50 to decode the data received from the surface microprocessor 70 without itself having to take any measures to compensate for frequency drift induced by downhole temperature changes. This reduces the complexity of the downhole electronics.

Figure 4:
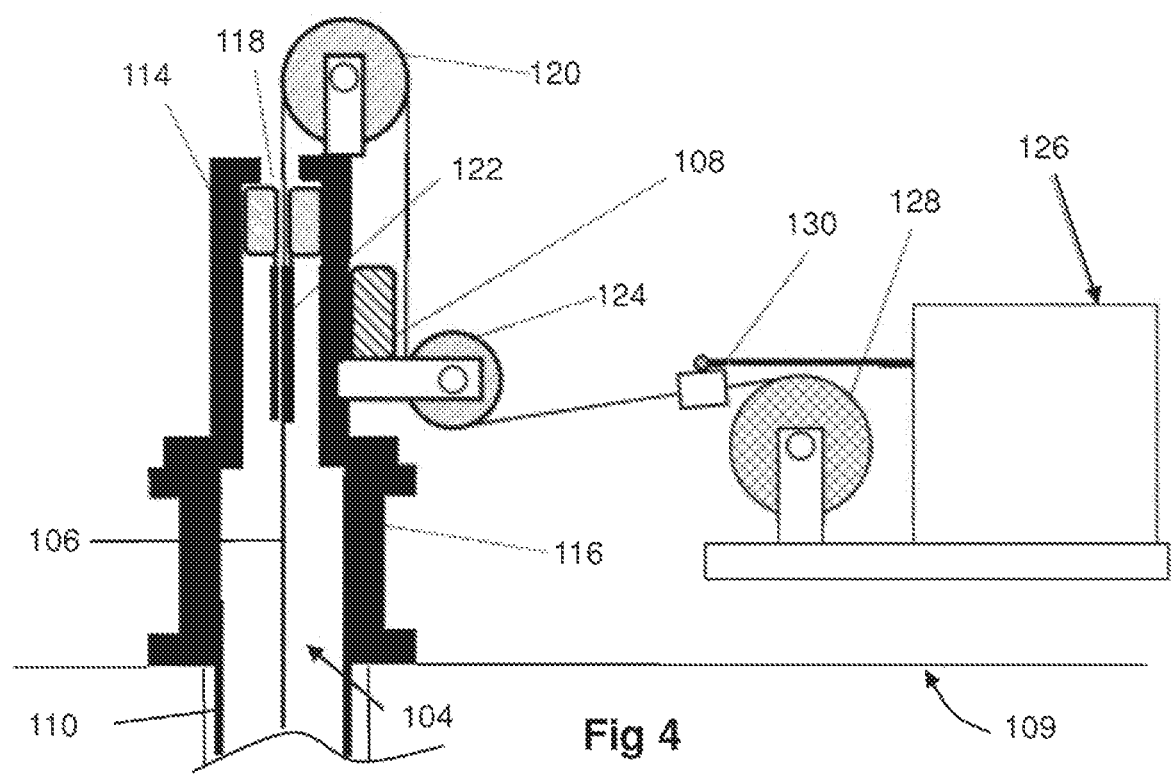
FIG. 4 shows a part of a second wellbore communication system.

FIG. 4 illustrates a part of a second wellbore communication system in a wellhead region at or adjacent a surface 109. The second wellbore communication system shares many like features with the first wellbore communication system 1 of FIGS. 1-3 and, as such, like features share like reference numerals. Like the first wellbore communication system 1 of FIGS. 1-3, the second wellbore communication system comprises a composite slickline 106 and a surface transceiver (not shown in FIG. 4) located within a surface transceiver enclosure 108 above or adjacent the surface 109. In use, the composite slickline 106 conveys signals between a downhole transceiver within a downhole tool in a wellbore 104 and the surface transceiver within the surface transceiver enclosure 108. The composite slickline 106 also supports the downhole tool within the wellbore 104. An electrically conductive casing string 110 is installed within the wellbore 104. A stuffing box 114 is mounted on a wellhead member 116 located at or adjacent surface 109. The stuffing box 114 comprises flow tubes 118 which fit closely around the composite slickline 106 and serve to form a pressure seal to prevent the escape of well fluids from the wellbore 104.

The second wellbore communication system further comprises an elongate tubular sensing element 122 which is capacitively coupled to the composite slickline 106. The sensing element 122 extends around the composite slickline 106 whilst allowing the composite slickline 106 to run freely therethrough. The second wellbore communication system differs from the first wellbore communication system 1 in that the sensing element 122 of the second wellbore communication system is mounted within the stuffing box 114 at a position below the flow tubes 118. The sensing element 122 is electrically insulated from the flow tubes 118. The composite slickline 106 runs through the elongate tubular sensing element 122, through the flow tubes 118 and over an upper sheave wheel 120 before running round a lower sheave wheel 124 on the way to a slickline unit generally designated 126. The slickline unit 126 includes a motor driven cable drum 128 for spooling the composite slickline 106 for raising and/or lowering a downhole tool within a wellbore 104. The slickline unit 126 also includes a steerable arm 130 for controlling spooling of the composite slickline 106 onto the drum 128.

The surface transceiver enclosure 108 is mounted on the stuffing box 114. The tubular sensing element 122 and the surface transceiver located within the surface transceiver enclosure 108 are configured for communication. For example, the tubular sensing element 122 and the surface transceiver located within the surface transceiver enclosure 108 may be configured for wireline or wireless communication. One skilled in the art will appreciate that the operation of the second wellbore communication system closely resembles the operation of the first wellbore communication system 1.

Figure 5:
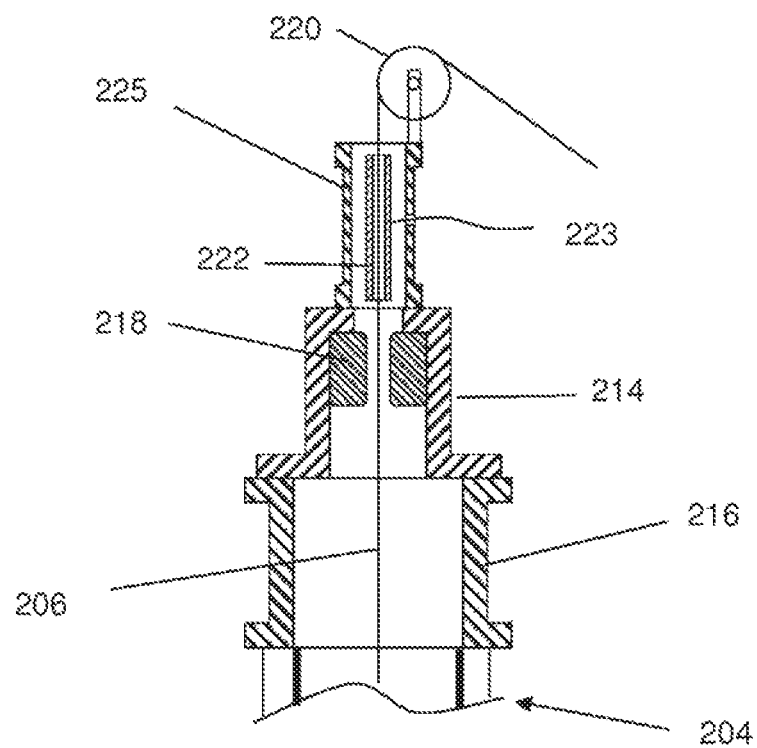
FIG. 5 shows a part of a third wellbore communication system.

FIG. 5 illustrates a part of a third wellbore communication system in a wellhead region. The third wellbore communication system shares many like features with the first and second wellbore communication systems of FIGS. 1-4 and, as such, like features share like reference numerals. Like the first and second wellbore communication systems, the third wellbore communication system comprises a composite slickline 206, an elongate tubular sensing element 222, and a surface transceiver (not shown in FIG. 5). The sensing element 222 is capacitively coupled to the composite slickline 206 and is connected to the surface transceiver via an electrical conductor 223. A stuffing box 214 is mounted on a wellhead member 216. The stuffing box 214 comprises flow tubes 218 which fit closely around the composite slickline 206 and serve to form a pressure seal to prevent the escape of well fluids from a wellbore 204. The third wellbore communication system differs from the first and second wellbore communication systems in that the sensing element 222 is mounted within a tubular housing 225 mounted above the stuffing box 214. The composite slickline 206 runs through the sensing element 222, and over an upper sheave wheel 220 on the way to a slickline unit (not shown). One skilled in the art will appreciate that the operation of the third wellbore communication system closely resembles the operation of the first and second wellbore communication systems of FIGS. 1-4.

Figure 6:
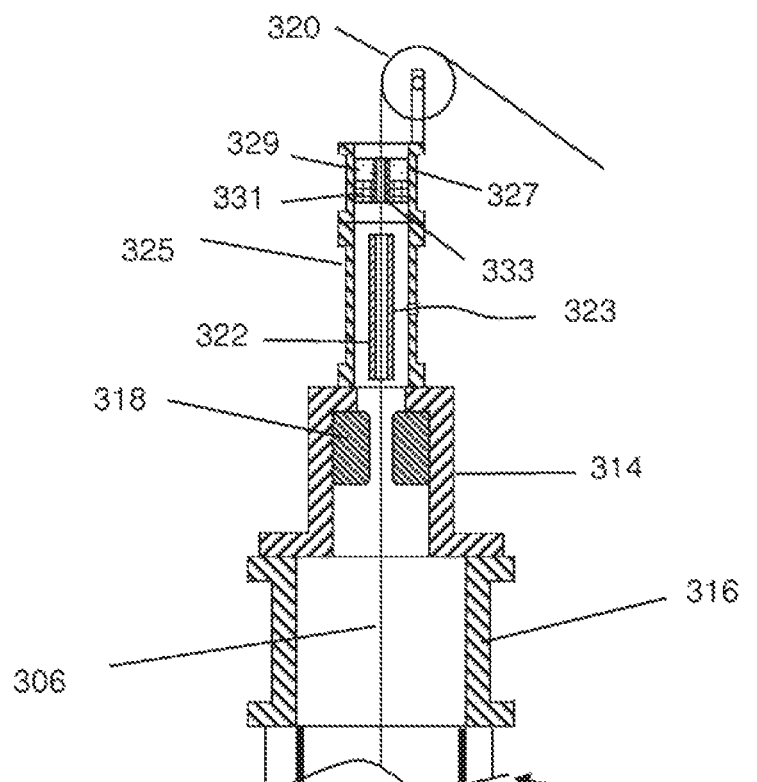
FIG. 6 shows a part of a fourth wellbore communication system.

FIG. 6 illustrates a part of a fourth wellbore communication system in a wellhead region. The fourth wellbore communication system shares many like features with the third wellbore communication system of FIG. 5 and, as such, like features share like reference numerals. Like the third wellbore communication system, the fourth wellbore communication system comprises a composite slickline 306, an elongate tubular sensing element 322, and a surface transceiver (not shown in FIG. 6). The sensing element 322 is capacitively coupled to the composite slickline 306 and is connected to the surface transceiver via an electrical conductor 323. A stuffing box 314 is mounted on a wellhead member 316. The stuffing box 314 comprises flow tubes 318 which fit closely around the composite slickline 306 and serve to form a pressure seal to prevent the escape of well fluids from a wellbore 304. Like the third wellbore communication system, the sensing element 322 is mounted within a tubular housing 325 mounted above the stuffing box 314. The sensing element 322 extends around the composite slickline 306 whilst allowing the composite slickline 306 to run freely therethrough. The composite slickline 306 runs through the elongate tubular sensing element 322, and over an upper sheave wheel 320 on the way to a slickline unit (not shown). The fourth wellbore communication system of FIG. 6 differs from the third wellbore communication system of FIG. 5, in that the fourth wellbore communication system comprises a further tubular housing 327 mounted above the tubular housing 325. The fourth wellbore communication system further comprises a toroid 329 and a ferrite ring 331 surrounding an insulating sleeve 333 located around the composite slickline 306 within the further tubular housing 327. In use, the toroid 329 and the ferrite ring 331 serve as electrical filters to at least suppress electrical noise coupled onto the composite slickline 306. In a variant of the fourth wellbore communication system of FIG. 6, the fourth wellbore communication system may comprise a further toroid (not shown) mounted adjacent the toroid 329 surrounding the sleeve 333. In such a variant, the toroid 329 may be used to sense electrical noise carried by the electrical conductor of the composite slickline 306 and the further toroid may be used to apply an electrical signal to the electrical conductor of the composite slickline 306 for cancellation of the electrical noise. The toroid 329 may, in particular, be used to sense 50 Hz electrical noise carried by the electrical conductor of the composite slickline 306, and the further toroid may be used to apply a 50 Hz electrical signal to the electrical conductor of the composite slickline 306 for cancellation of the 50 Hz electrical noise. One skilled in the art will appreciate that in other respects the operation of the fourth wellbore communication system closely resembles the operation of the first and second wellbore communication systems of FIGS. 1-4.

Figure 7:
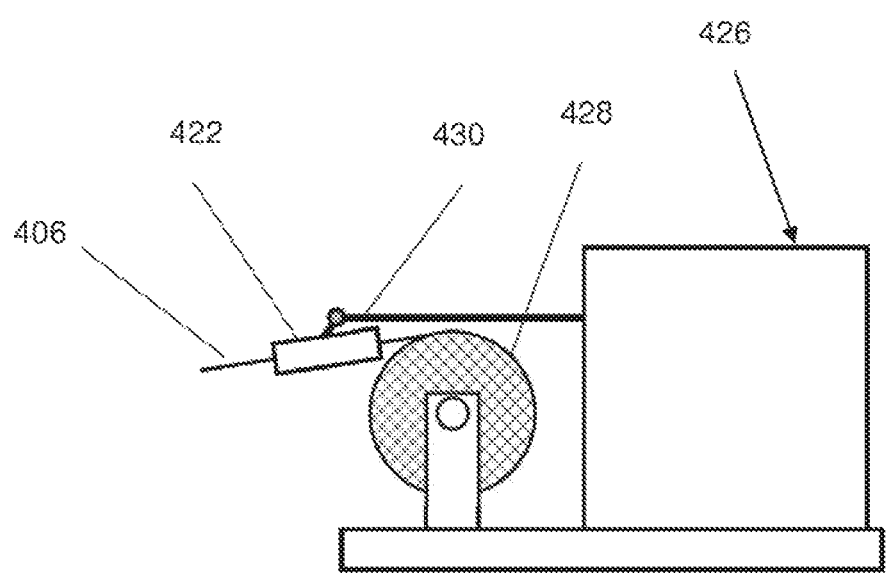
FIG. 7 shows a part of a fifth wellbore communication system.

FIG. 7 illustrates a slickline unit 426 of a fifth wellbore communication system. The fifth wellbore communication system shares many like features with the first to fourth wellbore communication systems of FIGS. 1-6 and, as such, like features share like reference numerals. The slickline unit 426 includes a motor driven cable drum 428 for spooling a composite slickline 406 for raising and/or lowering a downhole tool within a wellbore (not shown). The slickline unit 426 also includes a steerable arm 430 for controlling spooling of the composite slickline 406 onto the drum 428. The fifth wellbore communication system differs from the first to fourth wellbore communication systems shown in FIGS. 1-6, in that the fifth wellbore communication system comprises a tubular sensing element 422 which is designed into the steerable arm 430 and electrically insulated from the associated metalwork of the steerable arm 430.

Figure 8:
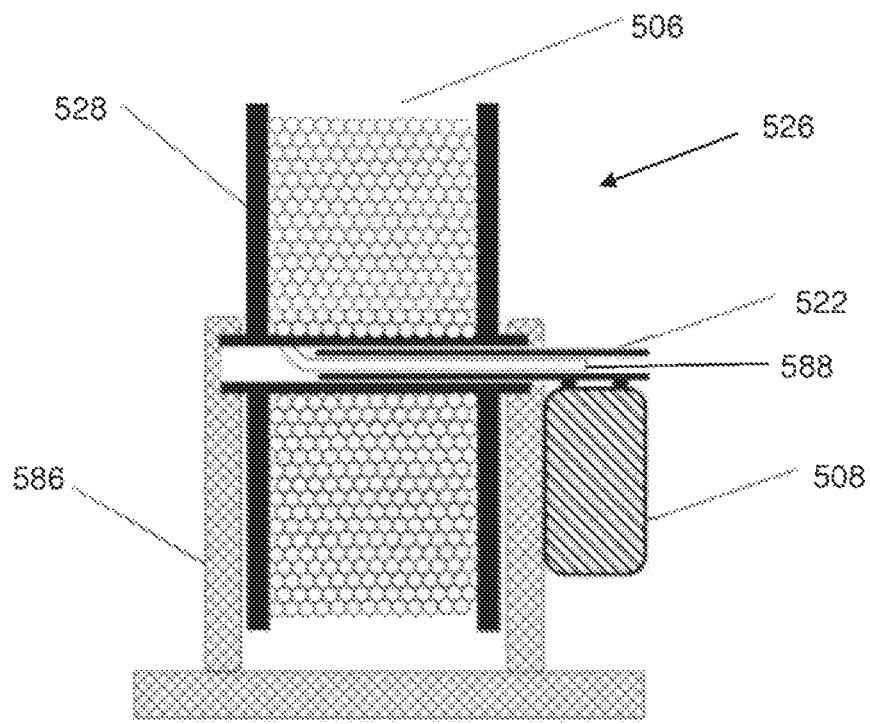
FIG. 8 is a schematic cross-section of a part of a sixth wellbore communication system.

FIG. 8 illustrates a cross-section through a motor driven cable drum 528 of a slickline unit 526 of a sixth wellbore communication system. The sixth wellbore communication system shares many like features with the first to fifth wellbore communication systems of FIGS. 1-7 and, as such, like features share like reference numerals. The motor driven cable drum 528 is configured for spooling a composite slickline 506 for raising and/or lowering a downhole tool within a wellbore (not shown). Like the first to fifth wellbore communication systems, the sixth wellbore communication system comprises a tubular sensing element 522 which is capacitively coupled to the composite slickline 506. However, the sixth wellbore communication system differs from the first to fifth wellbore communication systems, in that the tubular sensing element 522 is located inside the drum 528 along an axis of rotation of the drum 528. The tubular sensing element 522 is physically attached to, but electrically insulated from, a chassis 586 of the slickline unit 526 which supports the drum 528. An upper end 588 of the composite slickline 506 extends into, and rotates with, the drum 528 relative to the tubular sensing element 522. The sixth wellbore communication system further comprises a surface transceiver enclosure 508 which is attached to the chassis 586. The tubular sensing element 522 is electrically insulated from the surface transceiver enclosure 508 but is configured for communication with a surface transceiver (not shown) located within the surface transceiver enclosure 508.

Figure 9:
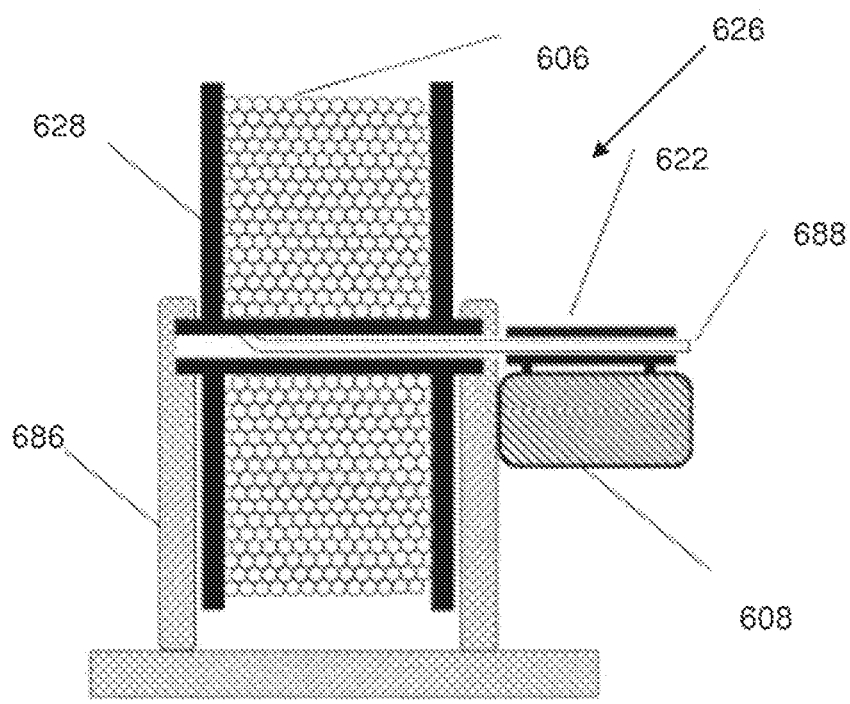
FIG. 9 is a schematic cross-section of a part of a seventh wellbore communication system.

FIG. 9 illustrates a cross-section through a motor driven cable drum 628 of a slickline unit 626 of a seventh wellbore communication system. The seventh wellbore communication system shares many like features with the sixth wellbore communication system of FIG. 8 and, as such, like features share like reference numerals. The motor driven cable drum 628 is configured for spooling a composite slickline 606 for raising and/or lowering a downhole tool within a wellbore (not shown). Like the sixth wellbore communication system of FIG. 8, the seventh wellbore communication system of FIG. 9 comprises a tubular sensing element 622 which is located along an axis of rotation of the drum 628. The tubular sensing element 622 of the seventh wellbore communication system is physically attached to, but electrically insulated from, a chassis 686 of the slickline unit 626 which supports the drum 628. An upper end 688 of the composite slickline 606 extends into, and rotates with, the drum 628 relative to the tubular sensing element 622. The seventh wellbore communication system further comprises a surface transceiver enclosure 608 which is attached to the chassis 686. The tubular sensing element 622 is electrically insulated from the surface transceiver enclosure 608 but is configured for communication with a surface transceiver (not shown) located within the surface transceiver enclosure 608. However, the seventh wellbore communication system differs from the sixth wellbore communication system in that the tubular sensing element 622 is located to one side of the drum 628.

Figure 10:
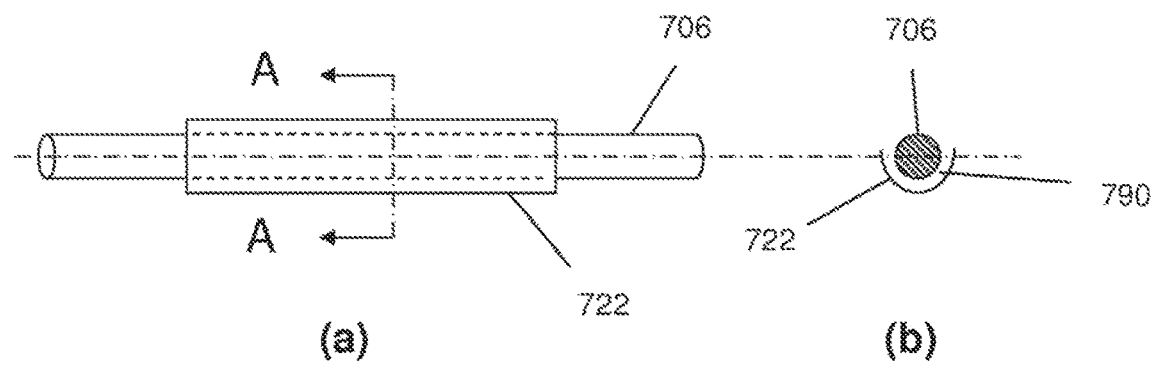
FIG. 10(a) is a side elevation of a sensing element and a slickline located adjacent the sensing element.
FIG. 10(b) shows a cross-section on AA of the sensing element and the slickline of FIG. 10(a)

Referring to FIGS. 10(*a*) and 10(*b*) there is shown an electrically conductive sensing element 722 which defines a U-shaped channel 790 which is configured to accommodate a composite slickline 706. The sensing element 722 is configured to extend adjacent to the composite slickline 706 and the U-shaped channel 790 is configured to be complementary in shape to an outer surface of the composite slickline 706 so as to enhance a capacitive coupling efficiency between the composite slickline 706 and the sensing element 722. It should be understood that the sensing element 722 may replace any of the tubular sensing elements 22, 122, 222, 322, 422, 522 and 622 in any of the foregoing wellbore communication systems.

Figure 11:
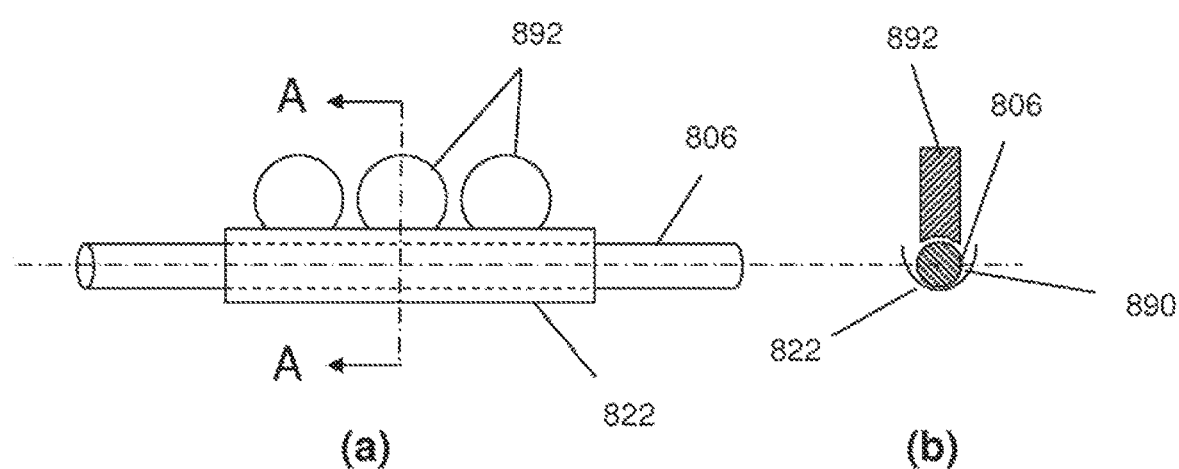
FIG. 11(a) shows a side elevation of a sensing element and a slickline located adjacent the sensing element.
FIG. 11(b) shows a cross-section on AA of the sensing element and the slickline of FIG. 11(a)

Referring to FIGS. 11(*a*) and 11(*b*) there is shown a sensing element arrangement comprising a sensing element 822 which defines a U-shaped channel 890 which is configured to accommodate a composite slickline 806. The sensing element arrangement further comprises rollers 892. In use, the rollers 892 serve to maintain the composite slickline 806 in close proximity to the sensing element 822 for enhanced coupling of an electric field therebetween. The rollers 892 may be biased so as to urge the composite slickline 806 into engagement with the U-shaped channel 890. It should be understood that the sensing element 822 may replace any of the tubular sensing elements 22, 122, 222, 322, 422, 522 and 622 in any of the wellbore communication systems corresponding to FIGS. 1-9.

Figure 12:
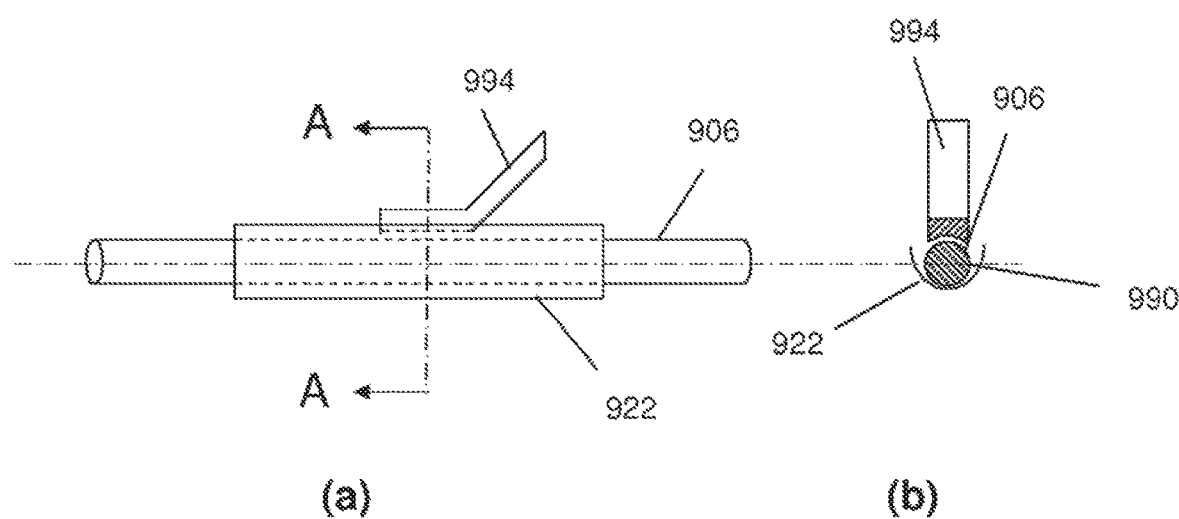
FIG. 12(a) shows a side elevation of a sensing element and a slickline located adjacent the sensing element.
FIG. 12(b) shows a cross-section on AA of the sensing element and the slickline of FIG. 12(a)

Referring to FIGS. 12(*a*) and 12(*b*) there is shown a sensing element arrangement comprising a sensing element 922 and a spring element 994 which is configured to bias a composite slickline 906 into engagement with a U-shaped channel 990 defined by the sensing element 922. It should be understood that the sensing element 922 may replace any of the tubular sensing elements 22, 122, 222, 322, 422, 522 and 622 in any of the wellbore communication systems corresponding to FIGS. 1-9.

Figure 13:
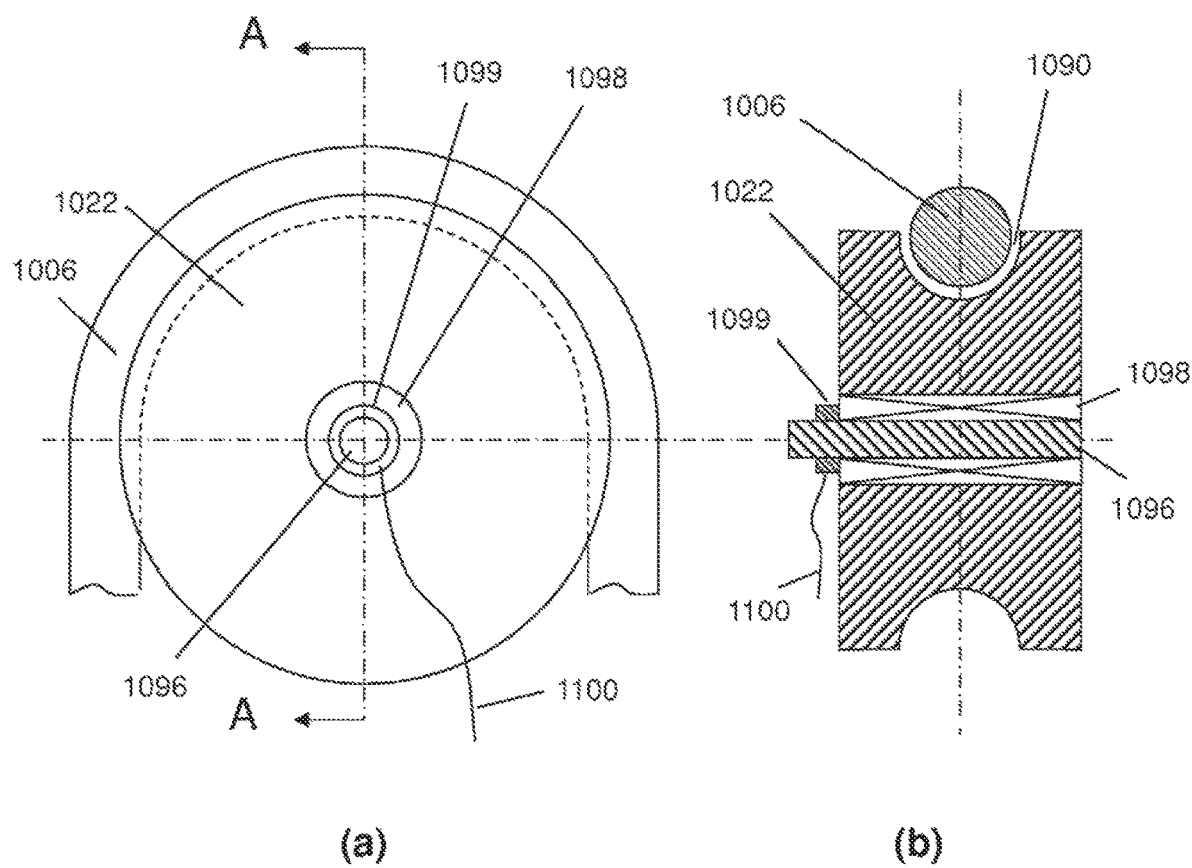
FIG. 13(a) shows a side elevation of a sheave sensing element and a slickline extending round the sheave.
FIG. 13(b) is a schematic cross-section on AA of the sheave sensing element and the slickline of FIG. 13(a)

FIGS. 13(*a*) and 13(*b*) a sensing element arrangement comprising a sheave sensing element 1022 having a composite slickline 1006 extending round the sheave sensing element 1022. The sheave sensing element 1022 defines a U-shaped channel 1090 on an outer surface thereof which is configured to accommodate the composite slickline 1006. The U-shaped channel 1090 is configured to be complementary in shape to an outer surface of the composite slickline 1006 so as to enhance a capacitive coupling efficiency between the composite slickline 1006 and the sheave sensing element 1022. The sheave sensing element 1022 is metallic and is attached to a metallic axle 1096 for rotation in a bearing arrangement 1098 supported by a chassis (not shown). The sheave sensing element arrangement further comprises a mercury wetted slip ring 1099 and an electrical conductor 1100. The electrical conductor 1100 is connected to a surface receiver (not shown). The mercury wetted slip ring 1099 provides an electrical connection between the sheave sensing element 1022 and the electrical conductor 1100 via the axle 1096. In use, transmission of an electrical signal along the composite slickline 1006 from a downhole tool induces a voltage signal in the sheave sensing element 1022 which is received and detected by the surface receiver for transmission of information from a downhole tool to the surface receiver. It should be understood that the sheave sensing element 1022 may be used as an alternative to any of the sensing elements 22, 122, 222, 322, 422, 522, and 622 in any of the wellbore communication systems corresponding to FIGS. 1-9. The sheave sensing element 1022 may be located anywhere between a stuffing box at a wellhead (not shown) and an upper end (not shown) of the composite slickline 1006. For example, the sheave sensing element 1022 may be located anywhere between the stuffing box 14 and an upper end of the composite slickline 6 of the wellbore communication system 1 shown in FIG. 1. In particular, the sheave sensing element 1022 may replace sheave 20 or 24 in FIG. 1.

It should be understood that the wellbore communication systems described herein are merely exemplary and that various modifications may be made thereto without departing from the scope of the invention. For example, the downhole transceiver may be attached to one or more of a range of well-known electric wireline tools strings, such as a string of wireline production logging tools, a wireline conveyed perforating gun system, a casing collar locator, a natural gamma ray depth correlation tool, a motorised wireline calliper tool, a motorised wireline centralisers or any other well-known electric wireline or conventional slickline tool.

With reference to the wellbore communication system 1 of FIGS. 1-3, an electrical conductor may connect the surface transceiver enclosure 8 to the casing string 10 so as to provide a portion of the electrical return path between the surface transceiver enclosure 8 and the enclosure 42 of the downhole tool 2 through the casing string 10.

Additionally or alternatively, when the tool 2 is deployed in an open-hole wellbore, an electrical conductor may connect the surface transceiver enclosure 8 to ground so as to provide a portion of an electrical return path between the surface transceiver enclosure 8 and the enclosure 42 of the downhole tool 2 through at least one of a formation around the wellbore 4, drilling mud, and wellbore fluids such as water, for example, seawater in the wellbore 4. The improved electrical insulation provided by the composite slickline 6 reduces the effect of the wellbore environment on the signal transmission properties of the composite slickline 6. The electrical insulation provided by the composite slickline 6 may be sufficient to permit a signal return path to be formed, or to be at least partially defined by, at least one of a formation around the wellbore, drilling mud and wellbore fluids such as water, for example, seawater in the wellbore.

What is claimed is:

1. A communication system, comprising:
   a composite slickline including an electrical conductor surrounded by an electrically insulating structural material;
   a downhole tool; and
   a sensing element,
   wherein the composite slickline is mechanically and electrically coupled to the downhole tool and extends from the downhole tool to the sensing element, and
   wherein the composite slickline and the sensing element are capacitively coupled so as to permit relative movement therebetween and so as to permit an electric field to extend from the electrical conductor of the composite slickline to the sensing element through the electrically insulating structural material of the composite slickline for the transmission of an electrical and/or an electromagnetic signal between the downhole tool and the sensing element via the composite slickline,
   wherein the electrically insulating structural material provides the composite slickline with mechanical strength whilst insulating the electrical conductor from an environment external to the composite slickline, and
   wherein the electrically insulating structural material comprises:
   a first layer formed on the electrical conductor, the first layer comprising a composite material which includes one or more aramid synthetic fiber reinforcing elements embedded in a PEEK matrix material;
   a second layer formed on the first layer, wherein the second layer is formed of PEEK; and
   one or more further layers formed on the second layer, wherein each one of the one or more further layers comprises a composite material which includes one or more aramid synthetic fiber reinforcing elements embedded in a PEEK matrix material.

2. The communication system according to claim 1, wherein:
   the reinforcing elements are continuous; and/or
   at least some of the reinforcing elements extend along the entire length of the composite slickline; and/or
   at least some of the reinforcing elements are oriented at the same predetermined angle relative to an axis of the composite slickline; and/or
   at least some of the reinforcing elements extend in a longitudinal direction which is parallel to an axis of the composite slickline; and/or
   all of the reinforcing elements generally extend in a longitudinal direction which is parallel to an axis of the composite slickline; and/or
   at least some of the reinforcing elements are oriented at a first angle relative to the axis of the composite slickline and at least some of the reinforcing elements are oriented at a second angle relative to the axis of the composite slickline.

3. The communication system according to claim 1, wherein the composite slickline comprises a sleeve or coating around the electrically insulating structural material, the sleeve or coating comprising at least one of an enamel material, polyester, polyamide, polyamide-imide, polycarbonates, polysulfones, polyester imides, a polyether ether ketone (PEEK) material, polyurethane, nylon, epoxy, equilibrating resin, alkyd resin, and a THEIC polyester.

4. The communication system according to claim 3, wherein:
   the sleeve or coating is visually distinguishable from the electrically insulating structural material; and/or
   the sleeve or coating comprises one or more of graphite, short para/meta-aramid fiber, carbon nanofibers (CNFs), titanium carbide (TiC), and a ceramic material.

5. The communication system according to claim 1, wherein the composite slickline has:
   an outer diameter of between 3 mm and 7 mm, an outer diameter of between 4 mm and 6 mm, and/or an outer diameter of 5 mm; and/or
   a resistance of between 10 and 100 ohm/km, a resistance of between 30 and 50 ohm/km, and/or a resistance of 40 ohm/km; and/or
   a weight of between 21 kg/km and 41 kg/km, a weight of between 26 kg/km and 36 kg/km, and/or a weight of 31 kg/km; and/or
   a minimum breaking load (MBL) of 1,700 to 3,700 kg, a MBL of 2,500 to 2,900 kg, and/or a minimum breaking load of 2,700 kg.

6. The communication system according to claim 1, wherein the electrical conductor has a diameter of between 0.1 and 1.0 mm, a diameter of between 0.2 and 0.4 mm, and/or a diameter of 0.3 mm.

7. The communication system according to claim 1, wherein the electrical conductor comprises a plurality of electrically conductive strands, wherein each strand is in electrical contact with each of the other strands, and wherein each strand has a diameter of between 0.1 and 1.0 mm, a diameter of between 0.2 and 0.4 mm, and/or a diameter of 0.3 mm.

8. The communication system according to claim 1, wherein the composite slickline comprises a plurality of electrical conductors, each electrical conductor being insulated electrically from each of the other electrical conductors by the electrically insulating structural material.

9. The communication system according to claim 1, wherein the composite slickline comprises one or more optical fibres.

10. The communication system according to claim 1, comprising a tool transmitter and a surface receiver, wherein the tool transmitter is provided with the downhole tool and is electrically coupled to the composite slickline, and wherein the surface receiver is electrically coupled to the sensing element.

11. The communication system according to claim 1, wherein the sensing element is separated from the composite slickline by a gap.

12. The communication system according to claim 1, wherein the sensing element engages the composite slickline.

13. The communication system according to claim 1, wherein the sensing element is elongated in a direction along which the composite slickline extends, wherein the sensing element at least partially surrounds the composite slickline and/or wherein the sensing element defines a surface profile which is generally concave, and/or wherein the sensing element defines a surface profile which is generally U-shaped.

14. The communication system according to claim 1, wherein the composite slickline extends through the sensing element.

15. The communication system according to claim 1, wherein the sensing element comprises an electric field sensor.

16. The communication system according to claim 1, wherein the composite slickline and the sensing element are inductively coupled.

17. The communication system according to claim 1, wherein the sensing element is generally tubular or wherein the sensing element comprises at least one of a loop, a ring, and a coil.

18. The communication system according to claim 1, wherein the sensing element comprises a ferritic material.

19. The communication system according to claim 1, wherein the sensing element comprises a magnetic field sensor and/or a Hall-effect sensor.

20. The communication system according to claim 1, comprising first and second toroids positioned adjacent to one another around the composite slickline, wherein the first toroid is configured to sense electrical noise carried by the electrical conductor of the composite slickline and the second toroid is configured to apply an electrical signal to the electrical conductor of the composite slickline for at least partial cancellation of the electrical noise.

21. The communication system according to claim 1, comprising a bias arrangement for urging the composite slickline towards and/or into engagement with the sensing element.

22. The communication system according to claim 21, wherein the bias arrangement comprises at least one of a spring arrangement and one or more pressure wheels or rollers.

23. The communication system according to claim 1, wherein the sensing element comprises a sheave wheel which is at least partially electrically conductive, the composite slickline engages the sheave wheel, and the sheave wheel is rotatable so as to accommodate movement of the composite slickline relative to the sheave wheel.

24. The communication system according to claim 1, comprising a slickline drum for spooling the composite slickline, wherein the sensing element is located on an axis of rotation of the slickline drum, and an upper end of the composite slickline extends at least partially into or through the sensing element so that the upper end of the composite slickline is rotatable relative to the sensing element.

25. The communication system according to claim 1, wherein the composite slickline comprises one or more hydraulic control lines.

26. A communication method, comprising:
mechanically and electrically coupling a downhole tool to a composite slickline which includes an electrical conductor surrounded by an electrically insulating structural material and which extends from the downhole tool to a sensing element;
capacitively coupling the sensing element and the composite slickline so as to permit relative movement therebetween and so as to permit an electric field to extend from the electrical conductor of the composite slickline to the sensing element through the electrically insulating structural material of the composite slickline; and
transmitting an electrical and/or an electromagnetic signal between the downhole tool and the sensing element via the composite slickline,
wherein the electrically insulating structural material provides the composite slickline with mechanical strength whilst insulating the electrical conductor from an environment external to the composite slickline, and
wherein the electrically insulating structural material comprises:
a first layer formed on the electrical conductor, the first layer comprising a composite material which includes one or more aramid synthetic fiber reinforcing elements embedded in a PEEK matrix material;
a second layer formed on the first layer, wherein the second layer is formed of PEEK; and
one or more further layers formed on the second layer, wherein each of the one or more further layers comprises a composite material which includes one or more aramid synthetic fiber reinforcing elements embedded in a PEEK matrix material.

\* \* \* \* \*